US009935898B2

(12) United States Patent
Alsup

(10) Patent No.: US 9,935,898 B2
(45) Date of Patent: Apr. 3, 2018

(54) ETHERNET INTERFACE MODULE

(71) Applicant: INNOVASIC, INC., Albuquerque, NM (US)

(72) Inventor: Andrew David Alsup, Albuquerque, NM (US)

(73) Assignee: INNOVASIC, INC., Albuquerque, NM (US)

(*) Notice: Subject to any disclaimer, the term of this patent is extended or adjusted under 35 U.S.C. 154(b) by 60 days.

(21) Appl. No.: 14/492,011

(22) Filed: Sep. 20, 2014

(65) Prior Publication Data

US 2016/0087917 A1 Mar. 24, 2016

(51) Int. Cl.
H04L 12/935 (2013.01)
H04L 12/931 (2013.01)
H04L 5/14 (2006.01)

(52) U.S. Cl.
CPC ........ *H04L 49/3036* (2013.01); *H04L 49/351* (2013.01); *H04L 5/1423* (2013.01)

(58) Field of Classification Search
CPC .. H04L 49/3036; H04L 49/351; H04L 5/1453
See application file for complete search history.

(56) References Cited

U.S. PATENT DOCUMENTS 5,600,629 A * 2/1997 Van Daele ........... H04B 7/1856
370/316
7,693,090 B1 * 4/2010 Kimpe ................ H04L 12/2867
370/254
2003/0223409 A1 * 12/2003 Wiebe .................. G10H 1/0058
370/352
2005/0232204 A1 * 10/2005 Bass .................... G06F 13/4022
370/335
2006/0176887 A1 * 8/2006 Fair ........................ H04L 67/08
370/401
2006/0245454 A1 11/2006 Balasubramanian
2007/0223533 A1 9/2007 Kirrmann
(Continued)

FOREIGN PATENT DOCUMENTS

WO    WO-2016044066 A1    3/2016

OTHER PUBLICATIONS

PCT International Search Report, PCT/US2015/049516, dated Nov. 27, 2015.
(Continued)

*Primary Examiner* — Walter Divito
(74) *Attorney, Agent, or Firm* — Schwegman Lundberg & Woessner, P.A.

(57) ABSTRACT

An Ethernet interface module comprises a first full duplex port, a second duplex port, a first path coupling the first duplex port and the second full duplex port, a second path coupling the second full duplex port and the first full duplex port, a first queue disposed in the first path, a second queue disposed in the second path, a third path comprising at least a portion of the first queue coupling the receive and transmit portions of the first port, a fourth path comprising at least a portion of the second queue coupling the receive and transmit portions of the second port, execution apparatus operable responsive to a command to alter the state of said Ethernet interface module, or the contents of said received frame to produce a return frame comprising fields of a received frame that are modified, or both.

39 Claims, 13 Drawing Sheets

(56) References Cited

U.S. PATENT DOCUMENTS

| | | | |
|---|---|---|---|
| 2008/0285575 A1* | 11/2008 | Biswas | H04L 41/04 370/401 |
| 2009/0147796 A1* | 6/2009 | Chow | H04L 47/6215 370/413 |
| 2010/0183011 A1 | 7/2010 | Chao | |
| 2010/0268963 A1 | 10/2010 | Iizuka et al. | |
| 2010/0278048 A1 | 11/2010 | Sawaguch | |
| 2011/0173352 A1 | 7/2011 | Sela et al. | |
| 2011/0191302 A1 | 8/2011 | Nasu et al. | |
| 2013/0148976 A1 | 6/2013 | Patel et al. | |
| 2013/0232251 A1 | 9/2013 | Pauley | |
| 2013/0243423 A1 | 9/2013 | He | |
| 2014/0029442 A1 | 1/2014 | Wallman | |
| 2014/0079064 A1 | 3/2014 | Angst et al. | |
| 2014/0269306 A1 | 9/2014 | Alsup et al. | |
| 2014/0269688 A1 | 9/2014 | Alsup et al. | |

OTHER PUBLICATIONS

PCT Written Opinion of the International Searching Authority, PCT/US2015/049516, dated Nov. 27, 2015.

* cited by examiner

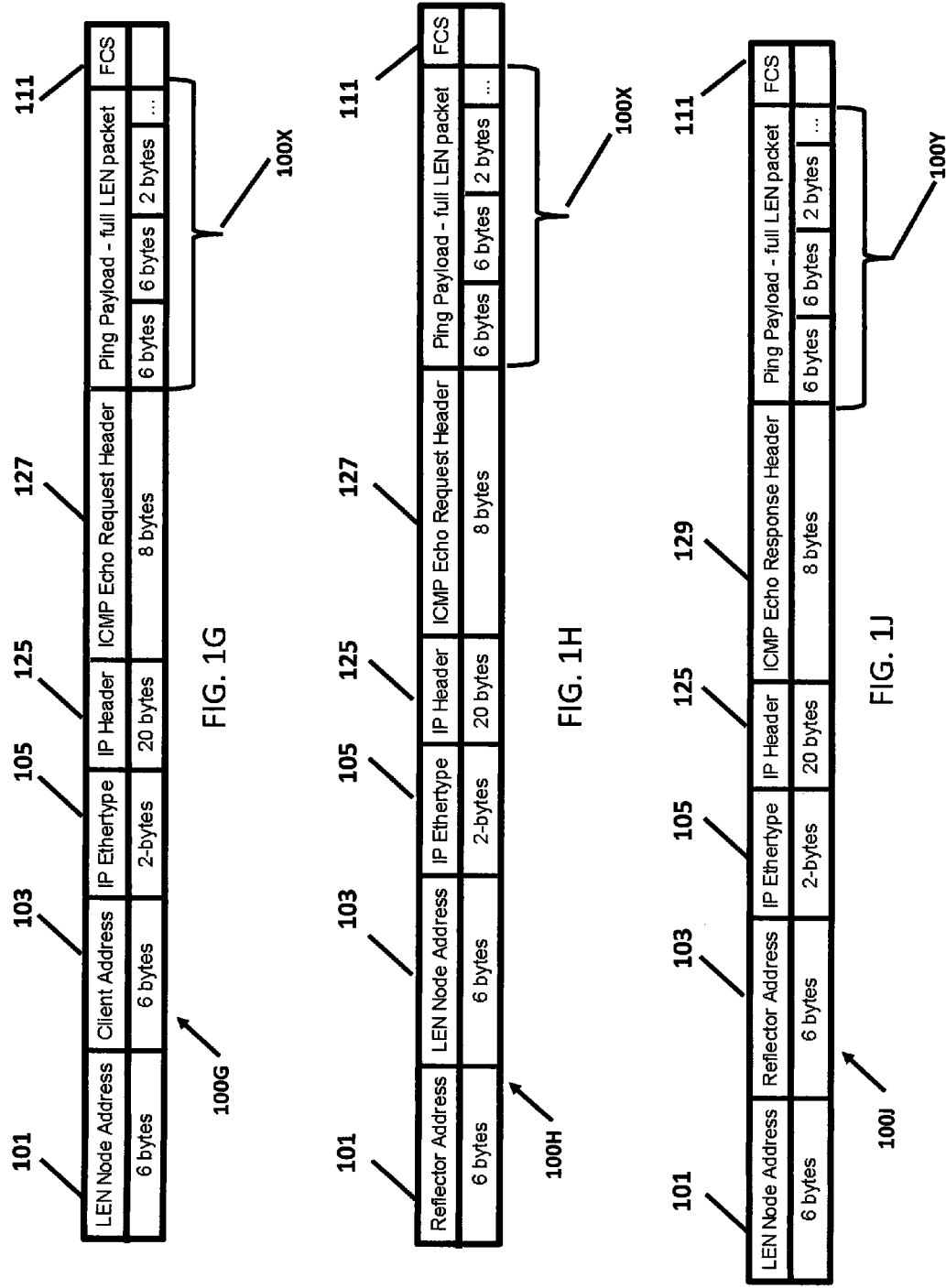

| Command ID | Name | Packet Offset | Data Offset | Data Size | Comments |
|---|---|---|---|---|---|
| 0x0000 | NOP | N/A | N/A | N/A | Fixed, Core – No Operation |
| 0x0001 | DISCOVER | N/A | N/A | N/A | Fixed, Core |
| 0x0002 | READ_CONFIG | N/A | N/A | N/A | Fixed, Core |
| 0x0003 | WRITE_CONFIG | N/A | N/A | N/A | Fixed, Core |
| 0x0004 | READ_BASE | N/A | N/A | N/A | Fixed, Core – Read base data from device |
| 0x0005 | WRITE_BASE | N/A | N/A | N/A | Fixed, Core – Write base data to device |
| ... | | | | | |
| 0x0100 | READ_DATA | config | config | config | Configurable, Read data from device |
| 0x0101 | WRITE_DATA | config | config | config | Configurable, Write data to device |
| ... | | | | | |
| 0x0800 | CMD_X | config | N/A | N/A | Configurable, vendor-specific command, set packet offset, local offset and data size not changeable |
| ... | | | | | |

FIG. 9

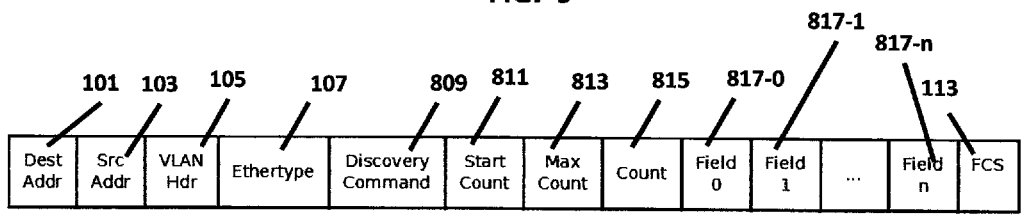

FIG. 10

ETHERNET INTERFACE MODULE

FIELD

The present invention pertains to Ethernet networking, in general, and to Ethernet interface modules, in particular.

BACKGROUND

Ethernet has seen use in a broad array of products. However, Ethernet requires a considerable amount of hardware and software to implement even a simple device.

A typical Ethernet device, even one with very simple functionality, requires the following components just to provide Ethernet communications (in addition to the actual function of the device):
 1. Ethernet physical access layer (PHY) and related magnetics, connectors and other hardware.
 2. Ethernet media access control (MAC) to communicate packets in digital form between the device and the PHY.
 3. Packet memory to store received packets while they're evaluated and consumed and to store outgoing packets for transmission.
 4. Microprocessor and software for evaluating a range of protocols communicated over the Ethernet. The protocols evaluated in an implementation would include some of the following, along with various other protocols:
    ARP (Address Resolution Protocol)
    ICMP (Internet Control Message Protocol)
    UDP (User Datagram Protocol)
    TCP (Transmission Control Protocol)
    DHCP (Dynamic Host Configuration Protocol)
    BOOTP (Bootstrap Protocol)
 5. Ethernet switching apparatus for each device comprising either a port on a general switch for each device or switching resources on the individual device. The Ethernet switching apparatus requires additional memory and hardware logic resources, as well as additional software/protocol requirements for switch management.

The components listed above are in addition to those required for the actual function of the Ethernet device.

The considerable amount of hardware and software to implement even an Ethernet simple device makes Ethernet cost prohibitive for certain classes of applications.

It is therefore highly desirable to provide an Ethernet interface or node that requires fewer components, is less complex and is of lower cost.

SUMMARY

In accordance with the principles of the invention a very low cost Ethernet interface is provided that pushes more complex functionality and product differentiation to higher-level devices.

The Ethernet interface embodiments utilize PHY and MAC blocks, but do not require packet memory, protocol evaluation software and per-device switching resources.

An embodiment of an Ethernet interface module that is configured to couple a device to an Ethernet network arrangement comprises a first full duplex port comprising a first PHY and a first MAC and a second full duplex port comprising a second PHY and a second MAC. The first full duplex port and the second duplex port are each operable to transfer frames between a network and the device. Each frame comprises a destination address field, a source address field, and a command field. The Ethernet interface module further comprises a first path coupling the first duplex port and the second full duplex port; a second path coupling the second full duplex port and the first full duplex port; a first queue disposed in the first path; a second queue disposed in the second path; and evaluation apparatus coupled to the first queue and to the second queue. The evaluation apparatus determines from a received destination address as received in a received frame from one of the first full duplex port or the second full duplex port whether the received frame is addressed to the device. The evaluation apparatus comprises command identifications associated with variable commands and the evaluation apparatus operates to identify variable commands that apply to the device upon receiving a command identification in the command field after determining that the received frame is to be utilized with the device.

The evaluation apparatus comprises memory that may be a random access memory to store the command identifications.

The evaluation apparatus is operable to cause a received frame to be forwarded from the one of the first full duplex port or the second full duplex port at which the received frame is received to the other of the one of the first full duplex port or the second full duplex port if the address is not associated with the Ethernet interface module.

The Ethernet interface module has one or more destination addresses associated therewith and the evaluation apparatus is operable to cause the received frame to be forwarded to and transmitted from the other of the one of the first duplex port or the second full duplex port if the received destination address is not associated with the Ethernet interface module.

The first queue is operable to store a first predetermined number of bytes of the received frame received at the first full duplex port and the second queue is operable to store a second predetermined number of bytes of the received frame received at the second full duplex port.

The first queue and the second queue are operated such that concurrent with a received frame being received at one of the first full duplex port and the second full duplex port, the received frame traverses the respective one of the first queue and the second queue and is provided to the other of the first duplex port and the second full duplex port as a transmitted frame.

The evaluation apparatus may comprise a unicast address for the device and one or more multicast addresses supported by the device.

The Ethernet interface module further comprises read/write apparatus. The read/write apparatus is operable such that if the evaluation apparatus determines that the destination address field of the received frame contains the unicast address, the read/write apparatus inserts a predetermined one of the one or more multicast addresses into the destination field in place of the destination address in the transmitted frame.

The evaluation apparatus is further operable to cause the received frame to be forwarded from the one of the first full duplex port or the second full duplex port at which the received frame is received to the other of the one of the first full duplex port or the second full duplex port if the address is not associated with the Ethernet interface module.

The Ethernet interface module may comprises a predetermined Ethertype associated therewith; and the evaluation apparatus is operable to determine if the received Ethertype in the received frame Ethertype field matches the predetermined Ethertype.

The evaluation apparatus, after determining that the received Ethertype matches the predetermined Ethertype, determines if the frame command field contains a received command that applies to the device.

The Ethernet interface module further comprises a device interface coupled to the device and a data memory. The data memory and the evaluation apparatus operate cooperatively in response to a received command applying to the device to extract received data from the received frame as the received frame traverses the first or second queue or to insert transmit data into the received frame in place of the received data.

The evaluation apparatus is operable to cause the received frame to be forwarded to and transmitted from the other one of the first duplex port or the second full duplex port if the destination address is not associated with the Ethernet interface module.

The evaluation apparatus, after determining that the received Ethertype corresponds to the device Ethertype, determines if the command field contains a received command that applies to the device. If the command field contains a received command that applies to the device, the Ethernet interface module data involved in the received command is extracted from the received frame or inserted into the transmitted frame. The transmitted packet is maintained by the Ethernet interface module at the same length as the received packet.

If the evaluation apparatus determines that the received command does not apply to the device, the received frame is transmitted from the Ethernet interface module as the transmitted frame.

The Ethernet interface module comprises an interface to the device; storage apparatus for storing data exchanged between the device and the first queue and the second queue; and read/write apparatus. The read/write apparatus operates to extract data from the received frame or to insert data into the received frame as the received frame traverses the Ethernet interface module.

The evaluation apparatus makes a determination of action to occur for a received frame. The determination of action is based upon one or more of a destination address in the destination address field of the received frame, an Ethertype in the Ethertype field of the received frame, and a command identification in the command field of the received frame.

The Ethernet interface module may be configured to couple a device to an Ethernet network arrangement comprises: a first full duplex port comprising a first PHY and a first MAC and a second full duplex port comprising a second PHY and a second MAC. The first full duplex port and the second duplex port are each operable to transfer frames of packet data between a network and a device. Each frame comprises a destination address field, a source address field, and a command field. The Ethernet interface module comprises a first path coupling the first duplex port and the second full duplex port; a second path coupling the second full duplex port and the first full duplex port; a first queue disposed in the first path, the first queue selected to store a predetermined number of bytes of a frame; a second queue disposed in the second path, the second queue selected to store the predetermined number of bytes of a frame; and evaluation apparatus coupled to the first queue and to the second queue, the evaluation apparatus is operable to determine whether the received frame is addressed to the device from a received destination address as received in a received frame from one of the first full duplex port or the second full duplex port. The first queue is operable to transfer each received frame received at the first full duplex port to the second full duplex port to provide a transmitted frame delayed by a predetermined fixed delay time. The second queue is operable to transfer each received frame received at the second full duplex port to the first full duplex port to provide a transmitted frame delayed by the predetermined fixed delay time. The evaluation apparatus comprises command identifications associated with variable commands. The evaluation apparatus operates to identify variable commands that apply to the device upon receiving a command identification in the command field after determining that the received frame is to be utilized with the device.

The predetermined fixed delay time may be determined by the predetermined number of bytes.

The Ethernet interface module comprises read/write apparatus. The read/write apparatus is operable to replace first predetermined packet data in the received frame received at one of the first full duplex port or the second full duplex port with second predetermined packet data as providing the received frame to the other of the first full duplex port and the second full duplex port.

The Ethernet interface module may also comprise an interface coupled to the device; and the read/write apparatus is coupled to the first queue and the second queue and to the interface. The read/write apparatus operates to extract received frame data from the first queue or the second queue and replaces the extracted receive frame data with data from the device.

The Ethernet interface module may further comprise a data memory. The data memory, the evaluation apparatus, and the read/write apparatus operate cooperatively in response to the received command applying to the device to extract the received frame data from the received frame as the received frame traverses a respective one of the first queue or the second queue and to insert transmit data into the received frame in place of the received data.

The Ethernet interface module is configured to couple a device to an Ethernet network arrangement comprises: a first full duplex port comprising a first PHY and a first MAC, a second full duplex port comprising a second PHY and a second MAC, a first path coupling the first duplex port and the second full duplex port, a second path coupling the second full duplex port and the first full duplex port, a first queue disposed in the first path, and a second queue disposed in the second path. The first full duplex port and the second full duplex port are each operable to transfer frames between a network and a device. Each the frame comprises a destination address field, and a command field. The Ethernet interface module further comprises evaluation apparatus coupled to the first queue and to the second queue, the evaluation apparatus determining from a received destination address as received in a received frame from one of the first full duplex port or the second full duplex port whether the received frame is addressed to the device. The evaluation apparatus comprises command identifications associated with variable commands and operates to identify variable commands that apply to the device upon receiving a command identification in the command field after determining that the received frame is to be utilized with the device.

An Ethernet interface module configured to couple a device to an Ethernet network arrangement comprises: a first full duplex port comprising a first PHY and a first MAC, and a second full duplex port comprising a second PHY and a second MAC. The first full duplex port comprises a first receive portion and a first transmit portion. The second duplex port comprises a second receive portion and a second transmit portion. The first full duplex port and the second duplex port are each operable to transfer packet frames between a network and the device. Each frame comprises a destination address field and a command field. The Ethernet interface module further comprises a first path coupling the first duplex port and the second full duplex port, a second path coupling the second full duplex port and the first full duplex port, a first queue disposed in the first path, a second queue disposed in the second path, a third path coupling the first receive portion and the first transmit portion and comprising at least a portion of the first queue, a fourth path coupling the second receive portion and the second transmit portion and comprising at least a portion of the second queue, and evaluation apparatus coupled to the first queue and to the second queue. The evaluation apparatus is operable to determine whether the received frame is addressed to the device from a received destination address as received in a received frame from one of the first full duplex port or the second full duplex port. The evaluation apparatus comprises command identifications associated with variable commands and operates to identify variable commands that apply to the device upon receiving a command identification in the command field after determining that the received frame is to be utilized with the device. The Ethernet interface module is operable in a first mode as an Ethernet field node and in a second mode as an Ethernet end mode. When the Ethernet interface module is in the first mode it is operable to receive a received frame at one of the first full duplex port or the second full duplex port and to transmit the received frame at the other of the first full duplex port and the second full duplex port, and when the Ethernet interface module is in the second mode it is operable to receive a received frame at one of the first full duplex port or the second full duplex port and to transmit the received frame at the same one of the first full duplex port and the second full duplex port.

The evaluation apparatus may comprise memory storing the command identifications. The memory may be a random access memory.

The evaluation apparatus is operable in the first mode to cause the received frame to be forwarded from the one of the first full duplex port or the second full duplex port at which the received frame is received to the other of the one of the first full duplex port or the second full duplex port if a received destination address contained in the received frame is not associated with the Ethernet interface module.

The device may have one or more destination addresses associated therewith.

The evaluation apparatus is operable in the first mode to cause the received frame to be forwarded to and transmitted from the other of the one of the first duplex port or the second full duplex port if the received destination address is not associated with the Ethernet interface module.

The first queue is operable to store a first predetermined number of bytes of the received frame received at the first full duplex port and the second queue is operable to store a second predetermined number of bytes of the received frame received at the second full duplex port.

The first queue and the second queue are operated in the first mode such that concurrent with a received frame being received at one of the first full duplex port and the second full duplex port, the received frame traverses the respective one of the first queue and the second queue and is provided to the other of the first duplex port and the second full duplex port as a transmitted frame.

The evaluation apparatus may comprise a unicast address for the device and one or more multicast addresses supported by the device.

The Ethernet interface module further comprises read/write apparatus operable such that if the evaluation apparatus determines that the destination address field of the received frame contains the unicast address, the read/write apparatus inserts a predetermined one of the one or more multicast addresses into the destination field in place of the destination address in the transmitted frame.

The evaluation apparatus is operable in the first mode to cause the received frame to be forwarded from the one of the first full duplex port or the second full duplex port at which the received frame is received to the other of the one of the first full duplex port or the second full duplex port if the address is not associated with the Ethernet interface module.

The Ethernet interface module comprises a predetermined Ethertype associated therewith, and the evaluation apparatus is operable to determine if the received Ethertype in the received frame Ethertype field matches a the predetermined Ethertype. After determining that the received Ethertype matches the predetermined Ethertype, the evaluation apparatus determines if the frame command field contains a received command that applies to the device.

The Ethernet interface module may further comprise a device interface coupled to the device, and a data memory. The data memory and the evaluation apparatus operate cooperatively in response to the received command applying to the device to extract received data from the received frame as the received frame traverses the Ethernet interface module or to insert transmit data into the transmitted frame in place of the received data. The transmitted packet is maintained by the Ethernet interface module at the same length as the received packet.

If the evaluation apparatus determines that the received command does not apply to the device, the received frame is transmitted from the Ethernet interface module as the transmitted frame.

The Ethernet interface module may comprise an interface to the device, storage apparatus for storing data exchanged between the device and the first queue and the second queue, and read/write apparatus. The read/write apparatus operates to extract data from the received frame or to insert data into the received frame as the received frame traverses the Ethernet interface module.

The Ethernet interface module is configured to couple a device to an Ethernet network arrangement comprises: a first full duplex port comprising a first PHY and a first MAC, a second full duplex port comprising a second PHY and a second MAC, a first path coupling the first duplex port and the second full duplex port, a second path coupling the second full duplex port and the first full duplex port, a first queue disposed in the first path selected to store a predetermined number of bytes of a frame, a second queue disposed in the second path selected to store the predetermined number of bytes of a frame, and evaluation apparatus coupled to the first queue and to the second queue. The first full duplex port and the second duplex port are each operable to transfer frames of packet data between a network and a device. Each frame comprises a destination address field, a source address field, and a command field. The evaluation apparatus is operable to determine whether the received frame is addressed to the device from a received destination address as received in a received frame from one of the first full duplex port or the second full duplex port. The first queue is operable to transfer each received frame received at the first full duplex port to the second full duplex port to provide a transmitted frame delayed by a predetermined fixed delay time. The second queue is operable to transfer each received frame received at the second full duplex port to the first full duplex port to provide a transmitted frame delayed by the predetermined fixed delay time. The evaluation apparatus comprises command identifications associated with variable commands and operates to identify variable commands that apply to the device upon receiving a command identification in the command field after determining that the received frame is to be utilized with the device. The Ethernet interface module is operable in a first mode as an Ethernet field node and in a second mode as an Ethernet end mode. The Ethernet interface module, when in the first mode, is operable to receive a received frame at one of the first full duplex port or the second full duplex port and to transmit the received frame at the other of the first full duplex port and the second full duplex port. The Ethernet interface module when in the second mode is operable to receive a received frame at one of the first full duplex port or the second full duplex port and to transmit the received frame at the same one of the first full duplex port and the second full duplex port at which the received frame is received.

An Ethernet interface module is configured to couple a device to an Ethernet network arrangement and comprises: a first full duplex port comprising a first PHY and a first MAC, said first duplex port comprises a receive portion and a transmit portion and is operable to transfer packet frames between a network and a device. Each frame comprises a destination address field and a command field. The Ethernet interface module further comprises a first path coupling the receive portion of the first duplex port to the transmit portion of the first full duplex port, a queue disposed in the first path, and evaluation apparatus coupled to the queue, the evaluation apparatus determining whether the received frame is addressed to the device from a received destination address as received in a received frame from the receive portion. The evaluation apparatus comprises command identifications associated with variable commands and operates to identify variable commands that apply to the device upon receiving a command identification in the command field after determining that the received frame is to be utilized with the device.

The Ethernet interface module comprises first memory storing the command identifications. The first memory comprises a random access memory.

The evaluation apparatus is operable to cause the received frame to be forwarded from the received portion to the transmit portion. The received frame is forwarded from the receive portion to the transmit portion without change when the received frame is not associated with the Ethernet interface module. The received frame is forwarded from the receive portion to the transmit portion without change when the received frame is not associated with the Ethernet interface module.

The queue is operable to store a first predetermined number of bytes of the received frame. The queue operates such that concurrent with a received frame being received via the received portion, the received frame traverses the queue and is provided to the transmit portion as a transmitted frame.

The evaluation apparatus comprises a unicast address for the device and one or more multicast addresses supported by the device. The Ethernet interface module further comprises read/write apparatus operable such that if the evaluation apparatus determines that the destination address field of the received frame contains the unicast address, the read/write apparatus inserts a predetermined one of the one or more multicast addresses into the destination field of the transmitted frame in place of the destination address in the received frame. The evaluation apparatus is operable to cause the received frame to be forwarded from the received portion to the transmit portion if the destination address is not associated with the Ethernet interface module. The Ethernet interface module comprises a predetermined Ethertype associated therewith, and is operable to determine if the received Ethertype in the received frame Ethertype field matches the predetermined Ethertype. The evaluation apparatus, after determining that the received Ethertype matches the predetermined Ethertype, is operable to determine if the frame command field contains a received command that applies to the device.

The evaluation apparatus, after determining that the received Ethertype corresponds to the device Ethertype, is operable to determine if the command field contains a received command that applies to the device. If the command field contains a received command that applies to the device, the Ethernet interface module data is extracted from the received frame or inserted into the transmitted frame. If the evaluation apparatus determines that the received command does not apply to the device, the received frame is transmitted as the transmitted frame. If the evaluation apparatus determines that the received Ethertype does not correspond to the device Ethertype, the received frame is transmitted from the Ethernet interface module as the transmitted frame.

The Ethernet interface module may further comprise: a device interface coupled to the device and a data memory. The data memory and the evaluation apparatus operate cooperatively in response to the received command applying to the device to extract received data from the received frame as the received frame traverses the queue or to insert transmit data into the received frame in place of the received data. The transmitted packet is maintained by the Ethernet interface module at the same length as the received packet.

The Ethernet interface module may further comprise: an interface to the device, storage apparatus for storing data exchanged between the device and the first queue and the second queue, and read/write apparatus. The read/write apparatus operates to extract data from the received frame or to insert data into the received frame as the received frame traverses the queue.

The evaluation apparatus makes a determination of action to occur for the received frame. The determination of action is based upon one or more of a destination address in the destination address field of the received frame, an Ethertype in the Ethertype field of the received frame, and a command identification in the command field of the received frame.

The queue is operable to transfer each received frame from the received portion to the transmit portion to provide a transmitted frame delayed by a predetermined fixed delay time. The queue is selected to store a predetermined number of bytes of a received frame. The queue is operable to transfer each received frame from the received portion to the transmit portion to provide a transmitted frame delayed by a predetermined fixed delay time. The predetermined fixed delay time is determined by the predetermined number of bytes.

An Ethernet interface module configured to couple a device to an Ethernet network comprises: a first full duplex port comprising a receive portion and a transmit portion and operable to transfer frames between the Ethernet network and the device; a second full duplex port comprising a second receive portion and a second transmit portion operable to transfer frames between the network and the device; a first path coupling the first duplex port and the second full duplex port; a second path coupling the second full duplex port and the first full duplex port; a first queue disposed in the first path; a second queue disposed in the second path; a third path coupling the first receive portion and the first transmit portion, the third path comprising at least a portion of the first queue; a fourth path coupling the second receive portion and the second transmit portion, the fourth path comprising at least a portion of the second queue; evaluation apparatus coupled to the first queue and to the second queue. The evaluation apparatus is operable to determine from a received destination address in a received frame from one of the first full duplex port or the second full duplex port whether the received frame is addressed to the device. Each received frame comprises a source address field comprising a source address, a destination address field comprising a destination address, a frame type field to identify a frame type and a command field utilized to provide a command to the device. The evaluation apparatus determines whether a received frame is addressed to the device and determines whether the frame type field contains a frame type.

Each frame type is used to identify whether or not the frame comprises predetermined fields. The predetermined fields comprise one or more of sequence identification fields and return address fields. Each frame type contained in the frame type field comprises a first predetermined bit set to a first state and each command contained in the command field comprises a first predetermined bit set to a second state, the first state and the second state are selected to be different to differentiate the frame type field and the command field.

Each Ethernet interface module comprises a destination address identifying the Ethernet interface module. Each received frame comprises a destination address field containing a destination address and a source address field containing a source address indicating the source of the frame. The Ethernet interface module is operable with the device to modify fields of the received frame and to not change the source address to produce a return frame.

The Ethernet interface module is operable with the device to modify fields of the received frame to produce a modified return frame, to insert the module's address into the source address field of the return frame and to utilize the return address to identify the destination of the return frame.

The Ethernet interface module may comprise a destination address identifying the Ethernet interface module and a return address. Each received frame comprises a destination address field containing the destination address and a return address field containing a source address indicating the source of the frame. The Ethernet interface module is operable with the device to modify fields of the received frame to produce a modified return frame, to insert the module's address into the source address field of the return frame, and to utilize the return address to identify the destination of the return frame. The return address is inserted into a destination address field of the return frame.

Each received frame comprises a sequence identification field containing a sequence identification. The sequence identifications for a series of received frames have a predetermined relationship to each other. The Ethernet interface module utilizes the sequence identifications to determine whether or not received frame has a predetermined relationship to the previous received frame. The Ethernet interface module performs a predetermined operation with the received frame when it is determined that the sequence identification of the received frame does not have the predetermined relationship. The predetermined operation may comprise rejection of the received frame. The predetermined operation may comprise providing an indication to the source of the received frame that the received frame has been rejected.

The Ethernet network comprises a master originating the receive frame; and the command field has one or more associated data fields comprising associated command data. The Ethernet interface module comprises a unique identification key associated therewith and the master is provided with the unique identification key.

The received frame comprises a sequence identification field and a security field, the sequence identification field comprises a sequence identification and the security field comprises an encrypted hash value for first data contained in one of the associated data fields. The encrypted hash value is computed over the sequence identification and the first data by the master utilizing the unique identification key.

The received frame may comprise a second sequence identification field and a second security field. The second sequence identification field comprises a second sequence identification. The second security field comprises a second encrypted hash value for second data contained in a second of the associated data fields. The second encrypted hash value is computed over the second sequence identification and the second data by the master utilizing the unique identification key.

The Ethernet interface module may further comprise: a first data register; a second data register; and apparatus operating on the receive frame to check the first data with the first encrypted hash value and the second data with the second encrypted hash value. The apparatus stores the first data in the first data register if the first encrypted hash value verifies the integrity of the first data and stores the second data in the second register if the second encrypted hash value verifies the integrity of the second data. The apparatus compares the first stored data and the second stored data. At least one of the first stored data and the second stored data is outputted to the device if the first stored data and the second stored data are identical. The Ethernet interface device rejects the received frame if the first stored data and the second stored data are not identical.

The Ethernet interface module is operable with the device to modify fields of the received frame to produce a return frame and to transmit the return frame over the Ethernet network. The return frame comprises a first return sequence identification field comprising a first return sequence identification and a first return data field comprising first return data to be sent over the Ethernet network and comprising a first return security field. The return frame comprises a second return sequence identification field comprising a second return sequence identification and a second return data field comprising second return data to be sent over the Ethernet network and comprising a second return security field. The first return security field comprises a first encrypted hash value computed over the return sequence identification and the first return data utilizing the unique identification key. The second return security field comprises a second encrypted hash value computed over the second return sequence identification and the second return data utilizing the unique identification key.

The return first sequence identification may comprise one of the sequence identification and a generated sequence identification, and the return second sequence identification may comprise one of the sequence identification and a generated second sequence identification.

The Ethernet interface module may comprise a counter counting the number of times each of the first sequence identification and the second sequence identification is utilized to produce a first count and a second count, respectively, and second apparatus modifying the first return sequence identification and the second sequence identification based upon the first and counts, respectfully.

In another embodiment, the Ethernet interface module comprises a first data register, a second data register, and apparatus operating on the received frame to check the first data with the first encrypted hash value. The apparatus stores the first data in the first data register if the first encrypted hash value verifies the integrity of the first data.

The master originates a second receive frame comprising a second sequence identification, second data and a second encrypted hash value computed over the second sequence identification and the second encrypted hash value. The apparatus operates on the second receive frame to check the second data with the second encrypted hash value and stores the second data in the second register if the second encrypted hash value verifies the integrity of the second data. The apparatus compares the first stored data and the second stored data. At least one of the first stored data and the second stored data is outputted to the device if the first stored data and the second stored data are identical. The Ethernet interface device rejects the received frame and the second received frame if the first stored data and the second stored data are not identical.

The Ethernet interface module is operable with the device to modify fields of the received frame to modify the received frame to produce a return frame and to transmit the return frame over the Ethernet network. The return frame comprises a first return sequence identification field comprising a first return sequence identification and a first return data field comprising first return data to be sent over the Ethernet network and comprising a first return security field. The return frame comprises a second return sequence identification field comprising a second return sequence identification and a second return data field comprising second return data to be sent over the Ethernet network and comprising a second return security field. The first return security field comprises a first encrypted hash value computed over the return sequence identification and the first return data utilizing the unique identification key. The second return security field comprises a second encrypted hash value computed over the second return sequence identification and the second return data utilizing the unique identification key.

The return first sequence identification comprises one of the sequence identification and a generated sequence identification and the return second sequence identification comprises one of the sequence identification and a generated second sequence identification.

The Ethernet interface module may further comprise a counter. The counter counts the number of times each of the first sequence identification and the second sequence identification is utilized to produce a first count and a second count, respectively. The second apparatus modifies the first return sequence identification and the second sequence identification based upon the first and second counts, respectively.

The Ethernet interface module is operable with the device to modify fields of the received frame to modify the received frame to produce a return frame and to transmit the return frame over the Ethernet network. The return frame comprises a first return sequence identification field comprising a first return sequence identification and a first return data field comprising first return data and comprising a first return security field. The Ethernet interface module is operable with the device to modify fields of a second received frame to modify the second received frame to produce a second return frame and to transmit the second return frame over the Ethernet network. The second return frame comprises a second return sequence identification field comprising a second return sequence identification and a second return data field comprising the return data and comprising a second return security field. The first return security field comprising a first encrypted hash value computed over the return sequence identification and the first return data utilizing the unique identification key. The second return security field comprising a second encrypted hash value computed over the second return sequence identification and the first return data. The return first sequence identification comprises one of the sequence identification and a generated sequence identification, and the return second sequence identification comprises one of the sequence identification and a generated second sequence identification.

A method of operating an Ethernet interface module configured to couple a device to an Ethernet network is provided. The Ethernet interface module comprises: a first full duplex port comprising a receive portion and a transmit portion and operable to transfer frames between the Ethernet network and the device and a second full duplex port comprising a second receive portion and a second transmit portion operable to transfer frames between the network and the device; a unique destination address; a first path coupling the first duplex port and the second full duplex port; a second path coupling the second full duplex port and the first full duplex port; a first queue disposed in the first path; a second queue disposed in the second path; a third path coupling the first receive portion and the first transmit portion, the third path comprising at least a portion of the first queue; a fourth path coupling the second receive portion and the second transmit portion, the fourth path comprising at least a portion of the second queue; evaluation apparatus coupled to the first queue and to the second queue to determine from a received destination address in a received frame from one of the first full duplex port or the second full duplex port whether the received frame comprises the unique address addressed to the device; each received frame comprises a source address field comprising a source address, a destination address field comprising a destination address, a frame type field to identify a frame type and a command field utilized to provide a command. The evaluation apparatus determines whether a received frame is addressed to the device and determines whether the frame type field contains a frame type.

The method comprises: receiving a frame comprising a command for the Ethernet interface module, the command defining one of the first full duplex port and the second full duplex port as an upstream port and the other of the first full duplex port and the second full duplex port as a downstream port, the frame providing a reflector address of a reflector Ethernet node, and the command executable to place the Ethernet interface module into a ping encapsulation mode.

The method further comprises: operating the Ethernet interface module in the ping encapsulation mode to forward a received frame comprising the unique address in the destination field and received at the upstream port to the downstream port with the destination address field of the received frame modified to provide a modified frame comprising the reflector address, the source address field of the received frame modified to comprising the unique address and a new cyclic redundancy check in the frame sequence field; and providing the modified frame with the remainder of the received frame unchanged with the exception of the frame check sequence field.

The method additionally may comprise operating the Ethernet interface module in the ping encapsulation mode to forward a second modified frame comprising an unchanged portion of a received frame comprising the unique address in the destination field and received at the downstream port to the upstream port with the frame sequence field comprising a cyclic redundancy check calculated over the portion of the downstream port received frame; and providing the modified downstream port received frame with the remainder of the downstream port received frame unchanged with the exception of the frame check sequence field.

The method may comprise; receiving a ping encapsulated frame at the upstream port comprising a ping encapsulation layer and a frame; forwarding the frame via the downstream port to the reflector Ethernet node; receiving a second ping encapsulated frame at the downstream port comprising a ping encapsulation layer and a response frame from the reflector Ethernet node; and removing the ping encapsulation layer from the second ping encapsulated frame and forwarding the response frame via the upstream port.

An Ethernet interface module configured to couple a device to an Ethernet network comprises: a first full duplex port comprising a receive portion and a transmit portion and operable to transfer frames between the Ethernet network and the device. Each received frame comprises a frame type field to identify a frame type and a command field utilized to provide a command to the device. The module further comprises a first path coupling the receive portion of the first duplex port to the transmit portion of the first full duplex port; a queue disposed in the first path; and evaluation apparatus coupled to the queue. The evaluation apparatus determines whether a received frame is addressed to the Ethernet interface module and determines whether the frame type field contains a frame type. The frame type is used to identify whether or not the frame comprises predetermined fields. The predetermined fields comprise one or more of sequence identification fields and return address fields.

The frame type contained in the frame type field comprises a first predetermined bit set to a first state and each command contained in the command field comprises a first predetermined bit set to a second state, the first state and the second state selected to be different to differentiate the frame type field and the command field.

BRIEF DESCRIPTION OF THE DRAWING

The invention will be better understood by a reading of the following detailed description in conjunction with the drawing figures in which:

FIGS. 1A, 1B, 1C, 1D, 1E, 1F, 1G, 1H, and 1J each illustrates a packet data frame format:

FIG. 9 is a table of commands implemented in the embodiment of FIG. 2;

FIG. 10 illustrates a discovery command;

DETAILED DESCRIPTION

An Ethernet physical transceiver is often referred to as a physical layer transmitter and/or receiver, a physical layer transceiver, a PHY transceiver, a PHYceiver, or simply a PHY. A PHY is commonly found on Ethernet devices. Its purpose is to provide analog signal physical access to the Ethernet link. A PHY chip implements hardware send and receive function of Ethernet frames. PHY interfaces to the line modulation at one end and binary packet signaling at the other. A PHY is usually used in conjunction with a second chip or interfaced to a microcontroller that takes care of the higher layer Media Access Control or MAC functions. IEEE 802.3-2002 section 4.1.4 sets out the functions required of a MAC.

As used herein PHY and MAC refer to blocks that provide the PHY and MAC functions, respectively.

The various embodiments of Ethernet interface modules described below comprise PHY and MAC, but do not include or require packet memory, protocol evaluation software and per-device switching resources. The various embodiments of Ethernet interface modules include the constraints that only full-duplex operation of the corresponding device is allowed, and all ports on the corresponding device associated with an Ethernet interface module must operate at the same data rate.

With the above constraints, devices utilizing Ethernet interface module embodiments can coexist in any typical Ethernet network including many of the very high-performance Ethernet environments including, but not limited to PROFINET, 1588V2, and AVB.

In the various Ethernet interface modules, there is no constraint on the specifics of the Ethernet physical implementation except it must be full duplex. By way of non-limiting example, the Ethernet physical implementation may include the use of optical fiber or copper cable, shielded cable or unshielded approaches, different signaling techniques over the cable, Power-Over-Ethernet, etc.

Full duplex operation allows simultaneous communication between a pair of stations or devices. With full duplex operation each station or device can simultaneously transmit and receive and accordingly, each Ethernet interface must be capable to simultaneously transmit and receive packet data frames.

Figure 1A:
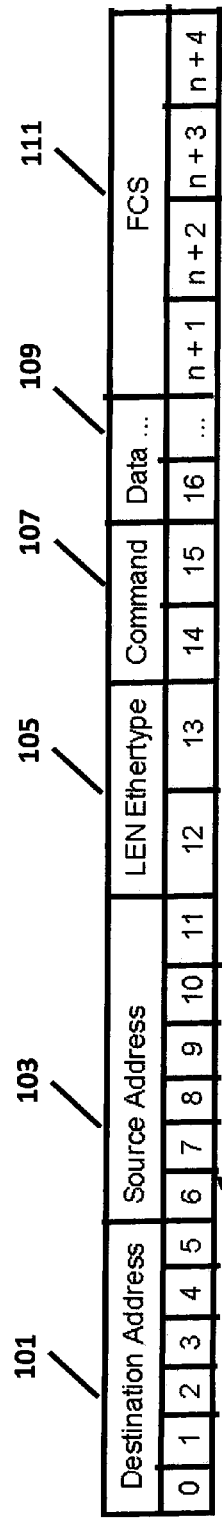

A basic frame format 100A for various embodiments of an Ethernet interface module is shown in FIG. 1A. Format 100A is illustrative and, as those skilled in the art will appreciate, is not limiting. The illustrative format 100A comprises a destination address field 101, source address field 103, Ethertype identification field 105, Ethernet interface module (EIM) command field 107, packet data field 109, and FCS (Frame Check Sequence) field 111.

Each Ethernet interface module is assigned a unique 48-bit address sometimes referred to as the interface's physical or hardware address. The destination address field 101 contains the address that corresponds to the address of the interface that is the destination of the packet frame. Alternatively destination address field 101 may instead contain a multicast address that one or more interfaces on the network have been enabled to receive, or a standard broadcast address.

Every Ethernet interface module attached to a network reads in every transmitted frame up through at least the destination address field 101. If the destination address of a frame does not match an Ethernet interface module's own address or one of a multicast or broadcast address that the Ethernet interface module is programmed to receive, then the Ethernet interface module may either discard the packet frame or forward it as described below.

Source address or SRC address field 103 contains the physical address of the Ethernet interface that sent the packet frame.

Ethertype identification field 107 contains an identifier that refers to the type of high-level protocol data carried in the packet data field 111.

Each Ethernet interface module supports a set of commands, which are specified in a Command field 109. Some common commands are defined as part of the basic protocol, while the majority of the available commands are left for use in device-specific operations. The command set is described in detail below.

Data field 111 carries the data.

Figure 1B:
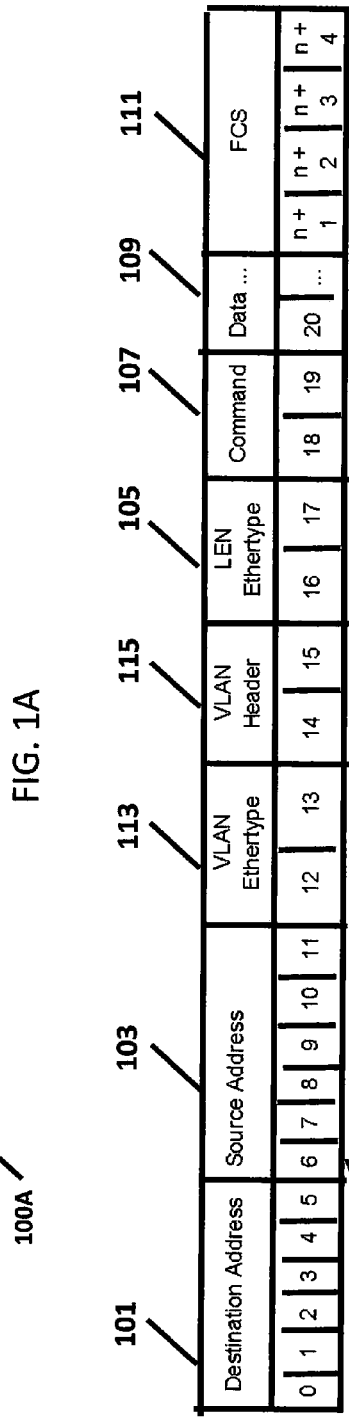

FCS (Frame Check Sequence) field 113 provides cyclic redundancy check (CRC) used to check the integrity of the bits in the various fields. As a frame is generated by a transmitting Ethernet station or master, a CRC value is calculated and inserted into field 113. A CRC is again calculated in a receiving Ethernet interface as the frame is received. The newly calculated CRC value is compared to the CRC value in field 113. If the two values are identical then there is a high level of assurance that no errors have occurred in transmission of the packet data frame A basic packet frame format 100B for with a VLAN (Virtual Local Area Network) header is shown in FIG. 1B. Packet frame format 100 is illustrative and, as those skilled in the art will appreciate, is not limiting. The illustrative format comprises a destination address field 101, source address field 103, VLAN (Virtual Local Area Network) header field 113, Ethertype identification field 105, Ethernet interface module (EIM) command field 107, data field 109, and FCS (Frame Check Sequence) field 111.

VLAN tag header field 113 identifies the VLAN to which the frame belongs.

VLAN tag header field 113 may be optional in certain embodiments. Where the VLAN header is optional, command field 107 is 16-bits long, and data field 109 is dependent on the command. Although the embodiment shows the use of a VLAN header, other header fields may be utilized.

Figure 2:
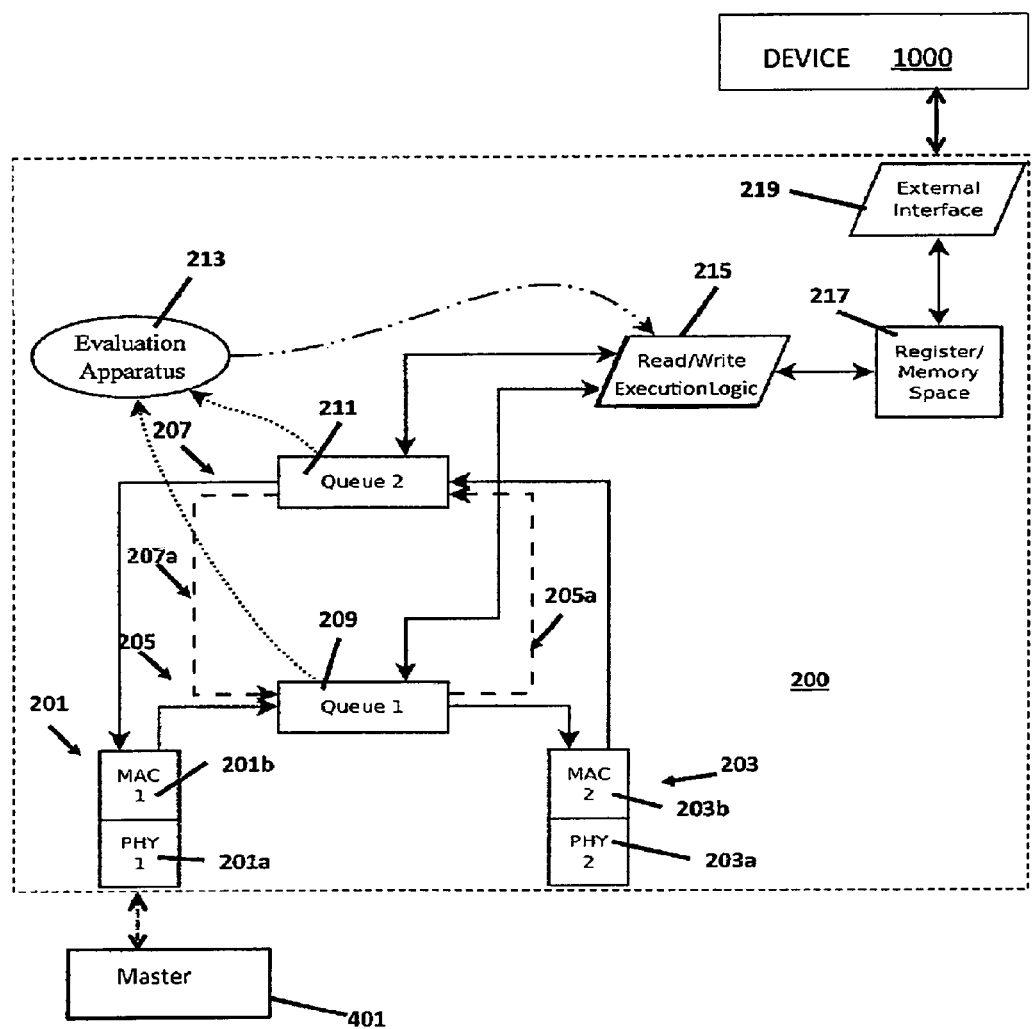
FIG. 2 is a block diagram of an embodiment of an Ethernet interface module.

A block diagram of an Ethernet interface module 200 is shown in FIG. 2. Ethernet interface module 200 comprises a first full duplex port 201 comprising a first PHY 201*a* and a first MAC 201*b*. Ethernet interface module 200 further comprises a second full duplex port 203 comprising a second PHY 203*a* and a second MAC 203*b*. Each port 201, 203 as a full duplex port comprises a transmit portion and a receive portion that are not shown for purposes of clarity.

A first path 205 couples the receive portion of port 201 to the transmit portion of port 203. A second path 207 couples the receive portion of port 203 to the transmit portion of port 201. Disposed within first path 205 is a first queue 209. Disposed within second path 207 is a second queue 211. Each queue 209, 211 is a few bytes in length, typically 6 or more bytes. A third path 205A couples the receive portion of port 201 to the transmit portion of port 201 and a fourth path 207A couples the receive portion of port 203 to the transmit portion of port 203.

In operation, each queue 209, 211 receives bytes from a received frame. As each new byte is received, the bytes are shifted in the queue toward the corresponding transmit portion. The length queues is less than the length of a frame and as a result, a received frame received at one of ports 201, 203 is transmitted as a transmit frame at the other port 203, 201 concurrent with the received frame still being received, but offset in time by a predetermined time delay. The predetermined time delay is determined by the size of the queues 201, 203.

By providing determinable constant time delays, the embodiments of the invention advantageously provide predictable consistent constant time delays for all devices utilizing Ethernet interface modules 200 in accordance with the principles of the invention.

Ethernet interface module 200 further comprises evaluation logic 213, read/write logic 215, register/memory 217 and a device interface 219. Evaluation logic 213 and read/write logic 215 may each be implemented with dedicated logic or in low-level software on a programmable device. Device interface 219 provides an interface to a device 1000. Data transfers between device 1000 and received frames occur via queues 209, 211, read/write logic 215, memory 217, and device interface 219.

The size and complexity of evaluation logic 213, read/write logic 215, memory 217 and a device interface 219 may vary depending on the requirements for the class of device. For example, register/memory may range from a few bytes to kilobytes of storage. Device interface 19 can range from a few digital inputs and/or outputs to a serial interface (e.g. SPI or UART), to a complex bus to communicate directly with a microprocessor.

Evaluation logic 213 comprises an address memory that contains one or more destination addresses for its associated device. The destination addresses comprise one or more multicast addresses associated with the device. In various embodiments some of the multicast addresses may be programmable. The memory typically is a random access memory. The memory may store unicast and multicast addresses for the associated device 1000. Evaluation logic 213 monitors each received frame as it traverses the first queue 209 or the second queue 211 and compares the destination address contained in the destination address field 101 of the received frame with the addresses associated with device 1000.

Each Ethernet interface module 200 may operate either as a "field nodes" or as an "end nodes". The designation as a field node or end node refers to the location and role of the Ethernet interface module 200 in a network. With the two-port Ethernet interface module 200 as shown in the FIG. 2, if only one port of the two ports 201, 203 is connected (e.g. has an Ethernet link), then Ethernet interface module 200 will operate as an end node. If Ethernet interface module 200 has both ports 201, 203 connected it will operate as a field node.

Read/write or execution logic 215 is responsive to evaluation logic 213 to read data packets from a received frame for storage in memory 217 and transmission to device 1000 via device interface 219, and to write data packets from device 1000 received via interface 219 and stored in memory 217.

When Ethernet interface module 200 operates as a field node, while a frame is received on one of the ports 201, 203, the first six bytes of the received frame are stored in the respective queue 209, 211 and are evaluated by evaluation logic 213 for a match with the MAC address of device 1000 and one-or more multicast addresses supported by device 1000. If there is an address match and if the destination address is the device's unicast address, the destination address of the packet is replaced with a predetermined one of the multicast addresses stored in Ethernet interface module 200.

As the frame bytes of a received frame are received at one of the ports 201, 203 and queued up in the respective one of queue 209, 211, the received frame is presented to the other port 203, 201 as a transmitted frame and transmission of the frame begins on the other port 203, 201. As each frame traverses a queue 209, 211 evaluation logic 213 checks the Ethertype field of the received frame. If the Ethertype contained in the Ethertype field matches the Ethertype of Ethernet interface module 200 then the following portions of the received frame are evaluated by evaluation logic 213 for a command that might apply to the device.

Examples of commands that apply to the device include things like Read Data, Write Data, etc. The data involved in the commands is extracted from the packet or inserted into the packet as appropriate while it traverses the node. The packet will be maintained at the same length on the way out as it is on the way in. That is, if bytes are written from the received frame into the memory 219, the same bytes are also written to the transmitted frame. However, if bytes are to be read from memory 219 into the received frame, the incoming bytes in the corresponding location of the received frame are discarded and replaced with the device data from memory 219.

Figure 3:
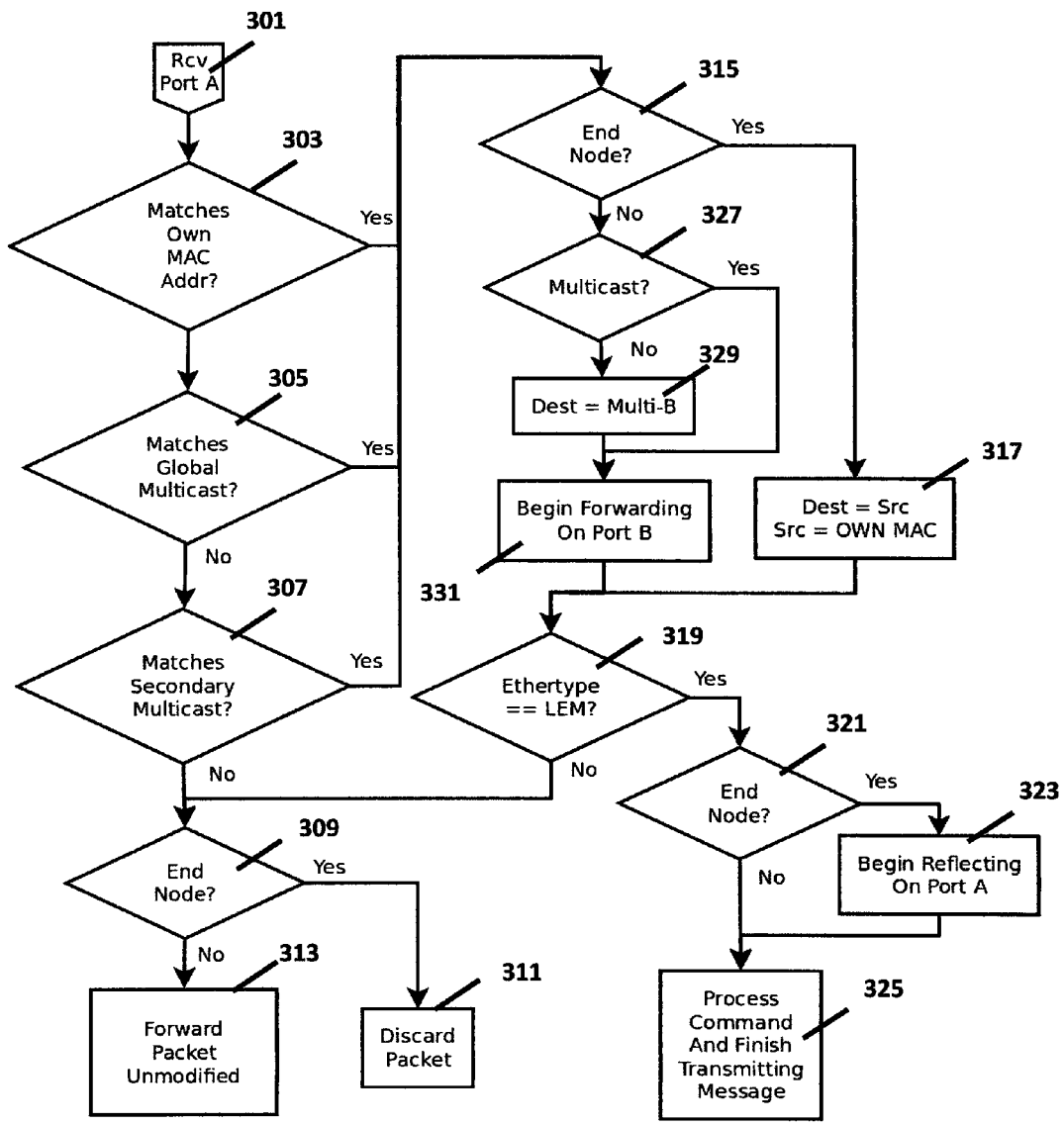
FIG. 3 is a flow chart illustrating a method of operation of the embodiment of FIG. 2.

Turning now to FIG. 3, the basic operation of Ethernet interface module 200 is shown. In FIG. 3, it is assumed at step 301, that a received frame is received at port 201. The first bytes from the received frame are queued in queue 209 and evaluation logic 213 determines at step 303 if destination address field 101 contains the address of device 1000. If the received frame does not contain the destination address of device 1000, evaluation logic 213 then determines at step 305 if destination address field 101 contains a global multicast address. If the received frame does not contain a global multicast address, evaluation logic 213 determines at step 307 if destination address field 101 contains a secondary multicast address for device 1000. If at step 307 it is determined that destination address field 101 does not contain a secondary multicast address for device 1000, evaluation logic 213 determines at step 309 if Ethernet interface module 200 is selected to be and end node or a field node. If Ethernet interface module 200 is an end node then Ethernet interface module 200 will discard the received frame at step 311. If Ethernet interface module 200 is not an end node, i.e., a field node, then Ethernet interface module 200 forwards the received frame unmodified as a transmitted frame at port 203. This allows Ethernet traffic that is not associated with device 1000 to traverse the network with minimal and fixed determinable delay.

If evaluation logic 213 determines at any of steps 303, 305, 307 that there is a destination address match, evaluation logic 213 next determines at step 315 whether Ethernet interface module 200 is an end node or a field node. If as a result of step 315 it is determined that Ethernet interface module 200 is an end node, then evaluation logic 213, at step 317, causes the destination address field 101 to be overwritten with the source address contained in the source address field 103 and evaluation logic 213 next determines if the Ethertype field 107 contains the Ethertype of device 1000. If Ethertype field 107 contains the Ethertype of device 1000, and if it is determined at step 321 that Ethernet interface module 200 is an end node, Ethernet interface module processes the command contained in command field 109 while reflecting the received frame on the receive portion of port 201. If Ethertype field 107 contains the Ethertype of device 1000, and if it is determined at step 321 that Ethernet interface module 200 is not an end node, Ethernet interface module 200 processes the command contained in command field 109 and completes transmission of a transmitted frame at step 325.

If at step 319 evaluation logic 213 determines that the Ethertype field 107 does not contain the Ethertype of device 1000, evaluation logic 213 determines at step 309 whether or not Ethernet interface module 200 is an end node. If it is determined that Ethernet interface module 200 is an end node, then the frame is discarded at step 311. If it is determined that Ethernet interface module 200 is not an end node, the unmodified received frame is transmitted from port 203.

If at step 315 evaluation logic 213 determines that Ethernet interface module 200 is not an end node, then evaluation logic 213 determines if the destination field 101 of the received frame contains a multicast address associated with device 1000. If the destination field contains a multicast address associated with device 1000 then the received frame is forwarded to port 203 and evaluation logic 213 determines at step 319 if the Ethertype field 107 contains an Ethertype associated with Ethernet interface module 200. Processing from step 319 proceeds as described hereinabove.

If at step 315 evaluation logic 213 determines that Ethernet interface module 200 is not an end node and evaluation logic 213, at step 327 determines that destination address field 101 does not contain a multicast address associated with device 1000, then at step 329 evaluation logic 213 causes the address in destination field 101 of the received frame to be written with a multicast address and at step 320 begins Ethernet interface module 200 begins forwarding the received frame to port 203. Evaluation logic 213, at step 319 then determines if the Ethertype in Ethertype field 107 matches the Ethertype of Ethernet interface module 200. Processing from step 319 proceeds as described hereinabove.

To summarize, if the incoming received frame fails any of the checks described above (destination address doesn't match, Ethertype doesn't match, or it isn't a supported command), then the received frame is forwarded out the other port unmodified as a transmitted frame. This allows traffic that is not associated with the associated device 1000 to traverse the network with only minimal delay.

Evaluation logic 213 may maintain a count of the number of invalid packets and other statistics of interest on a node for network diagnostic purposes. These statistics may be read through the general command framework.

On the transmit side of a port 201, 203, the packet Frame Check Sequence (FCS) is computed and inserted onto the transmitted frame in FCS field 113, replacing the FCS from the received frame. If an error is detected in the FCS computation on the received frame, an erroneous FCS is inserted on the transmitted frame to invalidate it.

Evaluation logic 213 may be programmed for a particular device type on how it will behave if it receives commands simultaneously on both ports 201, 203. The available options include:

Only operate on the first command recognized;
Perform both operations without any further limits;
Perform both operations only if they don't interfere with each other; or
Insert an error code in one or both packets.

When Ethernet interface module 200 is designated as an end node, if a received frame does not match the MAC address or one of the supported multicast addresses or if its Ethertype does not match, it is discarded. If all of these checks pass, the source address of the incoming frame is used as the destination address of the outgoing to send the message in the received frame back to the source controller that generated it. Then the MAC address of the device is used as the source address in the transmitted frame. Transmission of the frame is begun out the transmit portion of the same port it was received on via the respective path 205A, 207A. As the frame is forwarded, the same process of evaluating command field 109 and reading/writing the frame contents is performed just as it is in a field node.

Ethernet interface module 200 supports several features with respect to the processing of frames. The number of supported multicast addresses can vary as long as there is at least one. The set of commands supported may vary for each Ethernet interface module. VLAN headers can be treated in a few different ways. The VLAN headers can be ignored.

Ethernet interface module 200 may be further programmed such that VLAN field 105 can be used as an additional filter on analyzing multicast destination addresses. For example, the destination address may only be considered to match if the destination address in destination address field 101 matches and the VLAN field 105 matches.

When Ethernet interface module 200 is programmed as an end node, it can further be programmed to only reflect frames with a correct VLAN address in VLAN field 105. In addition, it may be programmed to replace the VLAN address of in VLAN field 105 of the received frame with another VLAN address when reflecting the received frame as a transmitted frame.

Ethernet interface module 200 may be programmed to only operate on certain commands if they are directed to the unicast address associated with device 1000. This allows for controlled access to only a single device with a generally recognized command.

Ethernet interface module 200 may further include data management functions including delaying application of incoming data until a received frame containing the data has been fully validated. To provide delaying application of incoming data a variety of approaches may be provided that range from providing in Ethernet interface module 200 a shadow memory or shadow register to allow multi-buffering of input data. Signaling may be provided at device interface 219 to indicate reception of fresh data, along with a validity indication. In addition a signal may be generated that output data has been transmitted only after the transmitted frame carrying the data has been validated. Ethernet interface module 200 may provide multi-buffering of output data to guarantee a consistent data set for transmission. Ethernet interface module 200 may also provide status flags to indicate that data is in the process of being read/written on the device interface 219.

Figure 1C:
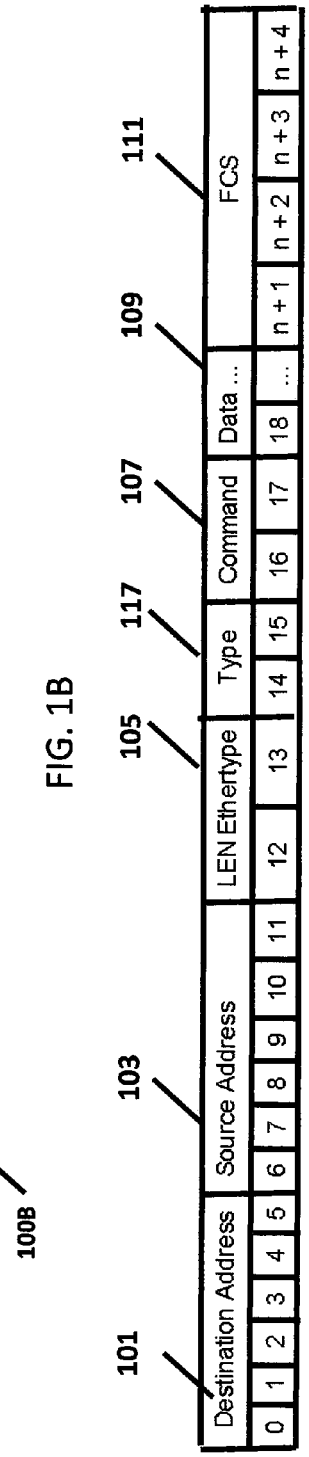

Because different devices 1000 may reasonably comprise a multiplicity of flavors of various complexities, including frames having different packet fields, Ethernet interface module 200 is further operable to distinguish between frame types. Each frame 100 may include a type field 117 as shown in FIG. 1C. Type field 117 may be selected to be 16 bits in length.

Table 1 below illustrates encoding for type field 117.

TABLE 1

| Encoding | Type |
|---|---|
| 0x8000 | basic encoding, no extra fields |
| 0x8001 | return address field added |
| 0x8002 | 16-bit sequence ID field added |
| 0x8004 | 32-bit sequence ID field added |
| 0x8008 | 64-bit sequence ID field added |
| 0x8009 | 64-bit sequence ID field and return address fields included |

All type encodings have the most significant bit set. The most significant bit of a command field 107 is never set. This permits differentiation between the type field 117 and the command field 107. By providing this differentiation, basic devices 1000 operate seamlessly with more complex ones.

Ethernet interface module 200, in its simplest form, modifies certain fields of a frame without changing the source address contained therein. The original source address is maintained in the outgoing frame to provide a destination back to the frame source when the frame reaches the end of a device string.

Figure 1D:
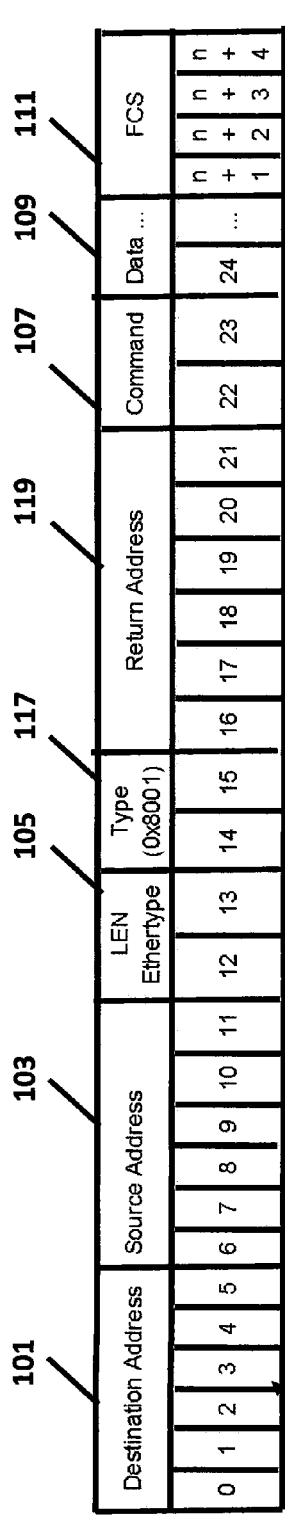

Alternatively a return address field 119 as shown in frame 100D in FIG. 1D is included in all frames 100D that support this protocol extension. Then each Ethernet interface module 200 that modifies a frame uses its own address as the source address and the end node or reflector Ethernet interface module 200 can use the return address.

Still further, potential end node Ethernet interface modules 200 may be programmed with a return address. This reduces frame overhead and shortens turnaround time on the end node Ethernet interface module 200. To implement this approach, no changes are needed to the frame, just an additional command and storage on end nodes.

When an Ethernet interface module 200 with this feature receives a frame addressed to it, it replaces the source address of the outgoing frame with its own MAC address. The end node Ethernet interface module 200 then uses the return address as the destination address when the frame is turned around.

For a basic frame 100A such as shown in FIG. 1A, the end node Ethernet interface module 200 has to wait until the Ethertype has been read and verified before transmission can begin. Now it must wait until reception of a return address before frame data can be transmitted out the return port. One consequence of this approach is that the frame turn-around incurs more latency delay.

However, this delay is actually minimal because in either case, transmission of the preamble can begin following receipt/validation of the Ethertype. Given that preamble is 8 bytes and the type/return address are also 8 bytes long, the effective additional delay is quite small (0-80 nanoseconds at 100 Mbit).

Figure 1E:
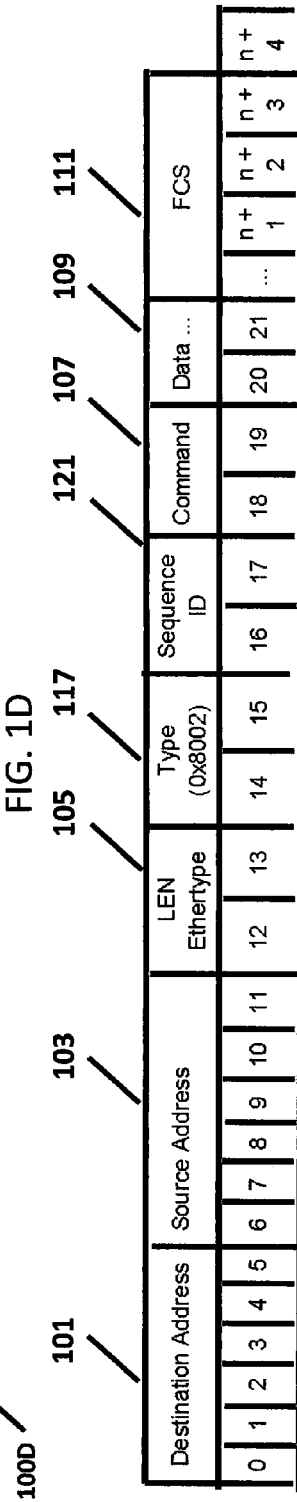

Turning now to FIG. 1E, a sequence identification ("sequence ID") field 121 is added to the protocol of frame 100E. Providing a sequence ID makes it possible to guarantee that frames arrive in the correct order and missed frames are detected.

In frame 100E, a 16-bit sequence ID is shown. Sequence ID fields of greater length can be used for special cases, e.g., in association with authentication, etc., but 16-bits is adequate for the purpose of managing frame order.

Ethernet interface module 200 does not modify the sequence ID of a frame. Rather the frame is returned with the received sequence ID. In operation, Ethernet interface module 200 expects an incrementing sequence of sequence IDs that wraps at full-scale. If an older frame, i.e., out of order frame, is received, it is not acted on but is rejected. An older frame can be detected by determining that a sequence number of a received frame bears a predetermined relationship to the previously received frame's sequence number.

Rejection of a frame is indicated to a master 401 in the operation of the command. For example, a READ command would not modify the data going back to master 401. A WRITE command has an associated receipt field that is modified by device 1000 on a successful operation and left unchanged for an unsuccessful one, e.g., the sequence ID is out of order. These details are a part of command encoding.

To address security within the local Ethernet network, an authentication approach is provided.

Figure 1F:
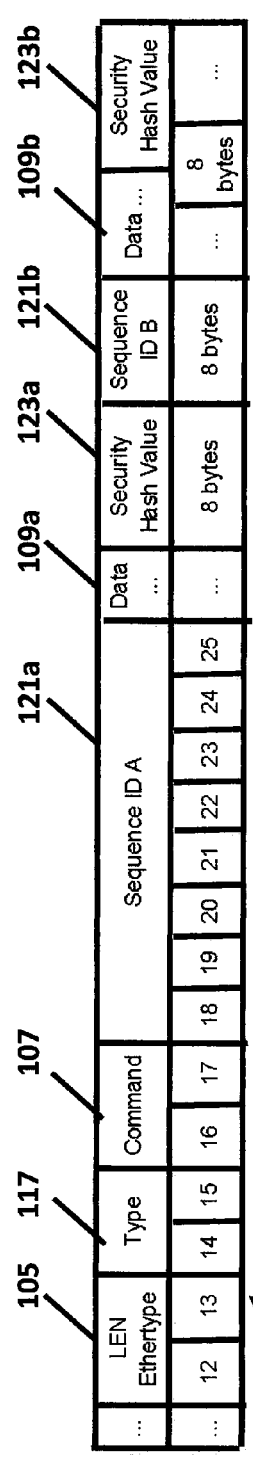

Each Ethernet interface module 200 has a key associated with it that is installed at manufacture or deployment time. Master 401 is provided with the keys of any Ethernet interface modules 200 with which it will communicate. The basic frame protocol formats are unchanged, rather additional data is included within the command data field 109. A frame 100F including the additional data is shown in FIG. 1F.

In frame 100F, each section of command data, e.g., to/from different devices has a separate sequence ID. Using a device-specific key (e.g. 128 bit), master 401 computes a cryptographic hash over the sequence ID 121a, 121b and accompanying data field 109a, 109b. This cryptographic hash is then inserted into frame 100F following the data in security hash value fields 123a, 123b. When an Ethernet interface module 200 receives the data it computes the same hash function over the sequence ID in sequence ID fields 121a, 121b and data in data fields 109a, 109b and verifies that it matches the hash values included in the received frame.

Similarly, for data to be read out from a device 1000, a new sequence ID is generated or the one most recently received from master 400 is utilized and a cryptographic hash is generated across the sequence ID and the data to be sent to master 400. When frame 1F including the appropriate read command traverses the Ethernet interface module 200, the sequence id fields, data fields and hash fields are transmitted and checked on receipt at master 400.

A 64-bit sequence ID was selected to ensure that sequence IDs do not need to be re-used, which would provide a mechanism for attack against device 1000 and/or master 400.

It will be apparent to those skilled in the art that smaller or larger values could be used. Similarly the cryptographic hash size is selected to be 64 bits to provide a good compromise between size and security.

Ethernet interface module 200 provides a safety channel over a general Ethernet network. Data is sent up two different, verified, channels within Ethernet interface module 200. This is accomplished in an integrated hardware implementation as described below in conjunction with FIGS. 4 and 5.

Master 400 determines an output value and encodes it into a frame as two data blocks 109a, 109b in FIG. 1F. Each data block 109a, 109b is then be secured with sequence IDs in fields 121a, 121b and encryption hash in fields 123a, 123b as described above. Two different encryption keys may be used. Frame 100F is then transmitted to an Ethernet interface module 200. Alternately, the two distinct safety data encoded data blocks 109a, 109b can be sent via two separate frames.

Figure 4:
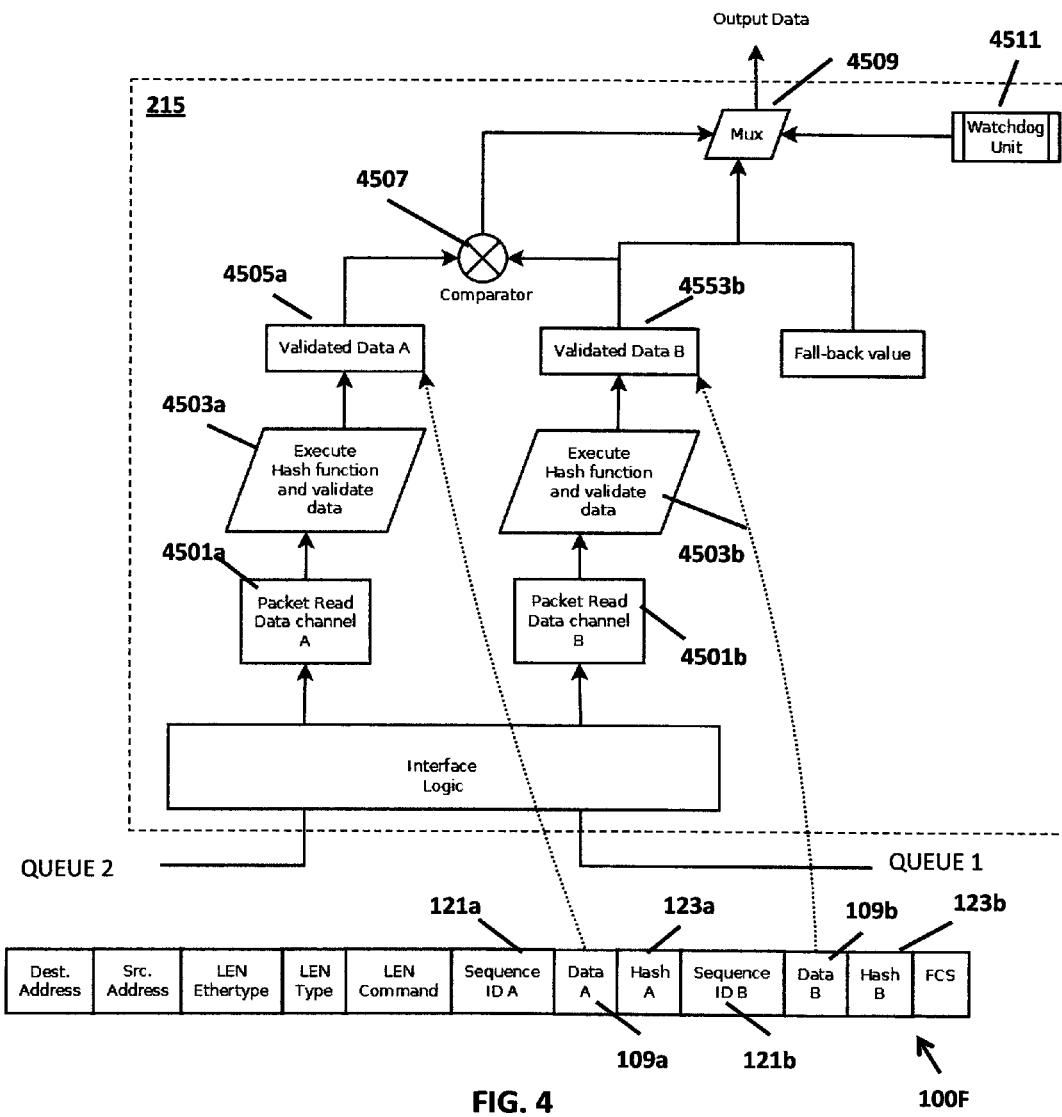
FIGS. 4 and 5 are detailed block diagrams of a portion of the embodiment of FIG. 2.
Figure 5:
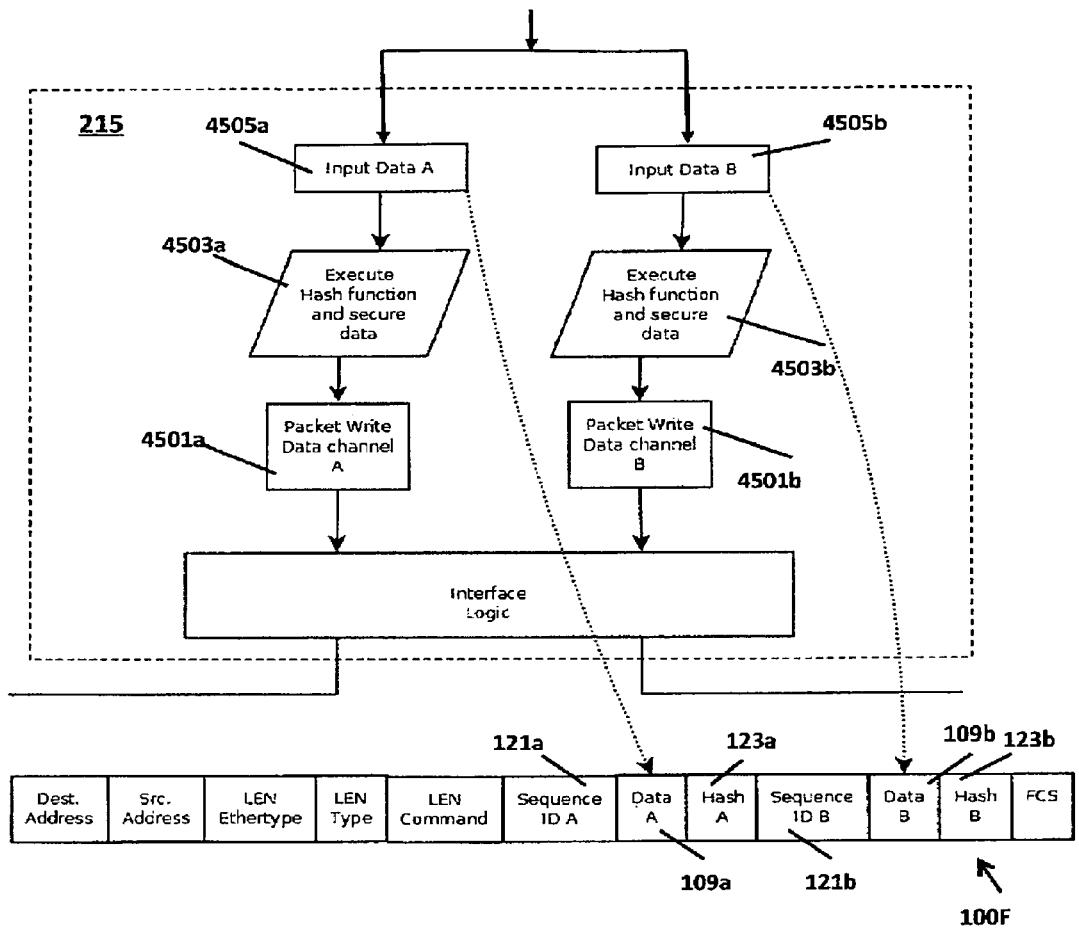

Upon receipt of the frame or frames 100F at Ethernet interface module 200, the two safety data encoded blocks in fields 109a, 109b are processed by read/write logic 215 shown in greater detail in FIGS. 4 and 5. For reference purposes, frame 100F is shown in each of FIG. 4 with the processing of data fields 109a, 109b indicated by arrows 4500a, 4500b. The safety encoded data blocks in fields 109a, 109b are received at blocks 4501a, 4501b. The safety encoded data blocks in fields 109a, 109b are checked against the encrypted hash value or values in fields 123a, 123b by hash function execution 4503a, 4503b and are loaded into separate registers 4505a, 4505b after any transform is complete. The encrypted hash values in the two registers 4505a, 4505b are compared by comparator 4507 and, if they match, the output will be applied to I/O multiplexor and outputted to device 1000. If they don't match then the frame or frames will be rejected. and a fall back hash value stored in block 4511 is outputted.

A watchdog timer 4511 is utilized and will reset to a default value if a valid frame is not received in predetermined programmable period of time.

Ethernet interface module 200 writes input frames received from device 1000 into the two separate registers 605a, 605b. The input frame data to be outputted to master 400 is then managed in reverse as described above. A sequence ID is provided to the input frame. The sequence ID used will be the one from the last successful receipt of output data from master 400. An additional small, e.g., 4-bit, counter that is not shown indicates the number of times that a sequence ID has been used. This information is loaded into an input frame destined for master 400.

On receipt of the input frame 100F at master 400, the frame data is unpacked, validated and compared.

This approach provides a pure hardware safety channel over a general Ethernet network.

The functionality of Ethernet interface device 200 is operational in a plurality of network topologies. Some examples of such network topologies are shown in FIGS. 6, 7, and 8.

Figure 6:
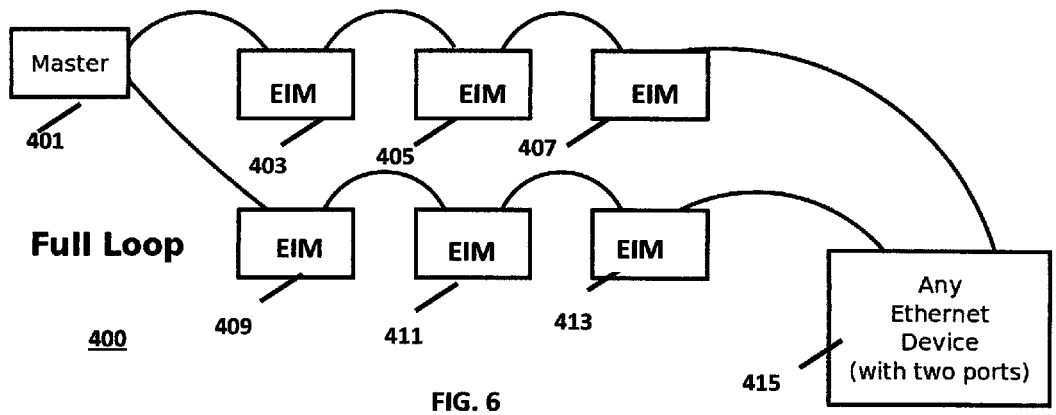
FIG. 6 illustrates a first Ethernet network topology.

FIG. 6 illustrates a representative full loop topology 400. Master 401 transmits a frame from one of its ports 401a and receives the same frame following modifications by Ethernet interface modules 403, 405, 407, 409, 411, 413, 415 on its other port 401b. Transmission to and from the non-Ethernet interface module node 415 is as if the Ethernet interface module 403, 405, 407, 409, 411, 413 devices were not present. Because there is no end node or reflector, the multicast destination address of the transmitted frames will not be changed (but unicast LEN packet destination addresses will be changed to multicast addresses).

Figure 7:
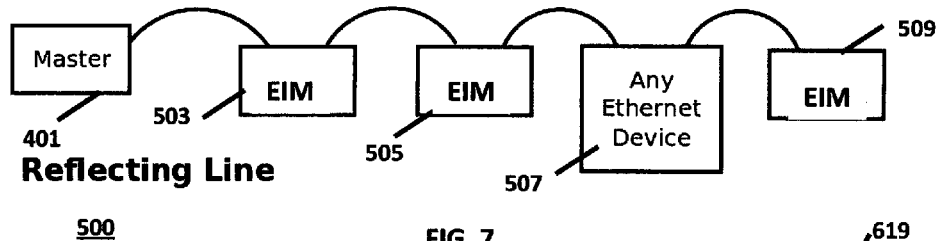
FIG. 7 illustrates a second Ethernet network technology.

In the reflecting line example illustrated in FIG. 7, master 401 transmits a frame that is modified by the various Ethernet interface devices 503, 505, 507, 509. The last Ethernet interface device 509 in the line, having only one port connected, replaces the destination address in the destination address field 101 of a received frame with the address of master 401, uses its own address as a source address in source address field 103, and transmits the received frame as so modified as a transmitted frame back to master 401.

Figure 8:
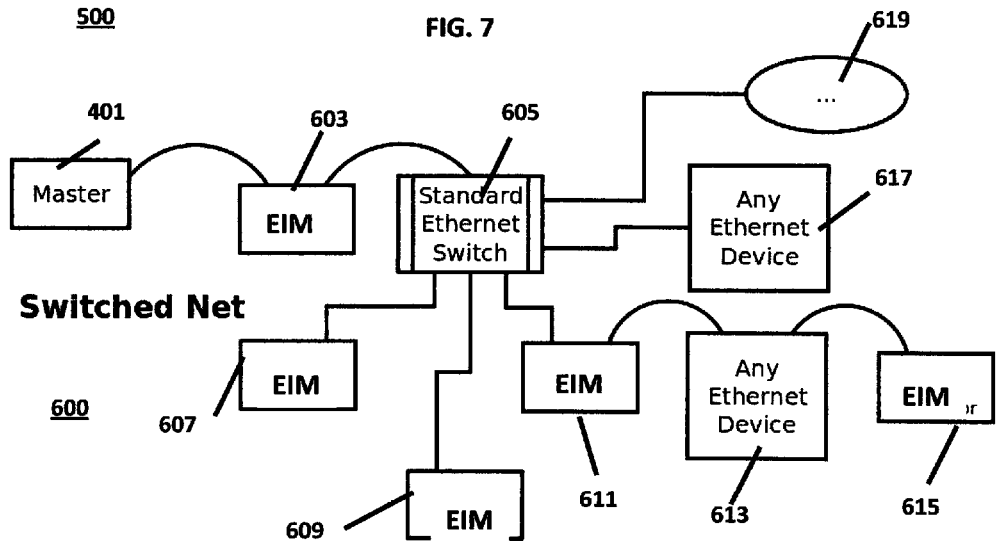
FIG. 8 illustrates a third Ethernet network technology.

In the example of FIG. 8, Ethernet interface modules 603, 607, 609, 611 615 are distributed throughout a standard Ethernet network 600 with a number of switches 605 and other device types 613, 617 coupled to a master 401. Switched network 600 operates similar to a number of reflecting lines where each reflecting device sends packets back to a master 401. For example, a multicast Ethernet interface device frame sent from master 401 that is intended to be operated on by the Ethernet interface device 603, before switch 605, will be forwarded through multiple paths to multiple reflectors 607, 609, 615. This results in many copies of a received frame being sent back to master 401. To avoid this multiplication of packets we use a few different supported techniques. By carefully controlling the routing of multicast packets through the switch, a specific multicast address can be used that will be acted on by a designated node, while only being routed from there to a single reflector. Or, again using a managed switch, VLAN IDs in VLAN ID field 105 can be used to route a frame to a single reflector 607, 609, 615.

Even without using a managed switch, the features of Ethernet interface module devices can be used to manage this situation. Different Ethernet interface modules can be assigned different multicast addresses, resulting in a frame in question only being reflected by a single end node. Similarly, VLAN headers in VLAN field 105 can be used so that only a single reflector will send back a frame in question, avoiding packet duplication.

These features allow control over frames flowing through a network, either using or not using managed switches.

Ethernet interface module 200 supports a rich set of commands that are specified in Command field 109 in a received frame. Some commands are defined as part of the basic protocol, while the majority of the available commands are left for use in device specific operations. FIG. 9 illustrates some of the commands implemented in one embodiment of Ethernet interface module 200.

Commands are either fixed or configurable. Fixed Commands always operate the same way regardless of how device 1000 has been configured. Configurable Commands can have various elements of functionality modified through configuration over the Ethernet. These elements include the specific command identification (ID), and an offset into the packet at which the device will read/write data, etc. Configurable commands provide a great degree of flexibility in building a complex device. The only constraint on command functionality is that they not interfere with the packet flow across the device. Any function that makes sense for a particular device can be assigned to a command.

In various embodiments, all devices share a set of fixed commands known as core commands. For very basic devices, the full supported command set may comprise only fixed commands. The core commands comprise:

Discover—described below;
Read Configuration—Read the current configuration of the device;
Write Configuration—Change the configuration of the device (specifically, set parameters for Configurable Commands);
Read Base Data—Read the basic input data associated with the device; and
Write Base Data—Write the basic output data associated with the device.

More complex devices will support additional commands. These can be either configurable or fixed. The complexity of these commands is not limited by the protocol, as long as they don't interfere with the data flow across the Ethernet interface module 200. Device-specific commands can be implemented as dedicated logic blocks, or can be performed by a programmable block. In the case of a programmable block in Ethernet interface module 200, it can load its program either from resources on the device (e.g. a ROM or written by a host processor) or it can be loaded by the configuration command for the device i.e., a controller will write the program for Electronic interface module 200 as part of a configuration process.

Each device that supports configurable commands has a random access memory table that indicates the command ID associated with a command, as well as other fields as necessary. This typically includes the size of data addressed by the command, the offset of the data in the frame that is executing the command, and an offset in memory/register space on the device to read/write the data for the command. The values given in the table of FIG. 7 are only examples.

This variable command approach allows a system designer to build a single frame that reads diverse data from multiple devices, writes data to multiple devices, reads data from one device and writes it to another, etc. For example, the same Ethernet interface module 200 Command ID could be configured as a Read command on some devices and a Write command on other devices so that a single frame would result in both operations. Some complex devices may support the configuration of a single Command ID to multiple commands, allowing a single command/frame to result in both read and write and perhaps some other functions in a single frame (at different offsets in the frame or shared offsets). Other Command IDs may have no correlation to any frame data, rather the frame is used as an event to trigger some behavior on the device.

Figure 10A:
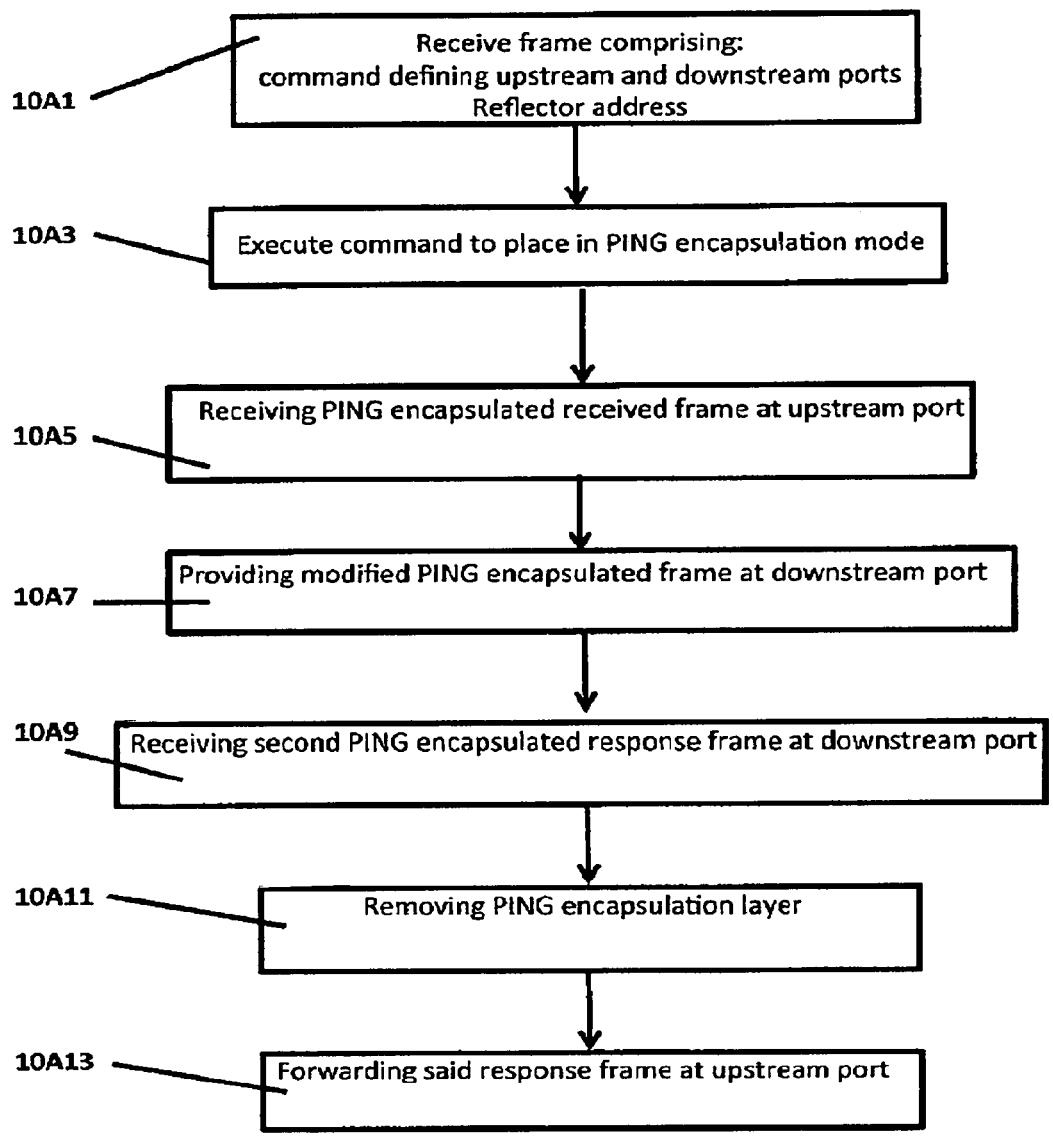
FIG. 10A illustrates a mode of operation of the embodiment of FIG. 2.

A command of specific interest is the Discovery Command. This allows an Ethernet interface module 200 master to determine what Ethernet interface module devices are available on the network and to learn about their relationship to each other on the network. A discovery frame 800 is shown in FIG. 10. Each of the fields 101, 103, 105, 107, 113 has been described in conjunction with FIG. 1A.

Start count field 801 contains a Start Count that is the beginning value for the discovery, as described below, it will allow for the discovery of a very large number of devices. A Max count field 811 contains a maximum count that can be accommodated in the current discovery frame. Count field 813 contains an index of the next device to be discovered. Fields 817-0, 817-1, . . . 817-n include information filled in by discovered devices. Fields 817-0, 817-1, . . . 817-n may include the following:

Device MAC Address (6 bytes);
Device Type (2-bytes)—to indicate a basic set of functions/data. Examples include
Switch, 8-bit I/O, Temperature Sensor, 1-bit input, 1-bit output, relay, etc.;
Vendor ID (4-bytes);
Vendor Device Type (2-bytes)—used to identify more specific/extensive features for a device;
Version Number (2 bytes); and
Vendor Field (4 bytes)—to allow further differentiation of devices depending on options, state, etc.

With this set of information, each device uses 20 bytes to report itself in discovery. A full-size discovery frame can report up to 73 devices.

A typical discovery process would start with the master sending a multicast packet formatted as shown with the values:

Start Count=0
MAX Count=72
Count=0

As the frame traverses Ethernet interface module 200 it will cause the count to be compared to the max Count in max count field 813. If the count is greater than the max count then the frame will be forwarded without modification (except when reflected in and end node as described above). If the count is less than max count, the current count field 815 will be used as an offset into the frame 800. The count will be incremented and written back to the transmitted frame as it leaves the device.

Next, the Ethernet interface module 200 will forward, unmodified, the contents of the received frame until it reaches a frame location identified from the count it read from the frame times the number of bytes in a field (e.g. 20)). At this point the data described above is written to the packet and the remainder of the packet forwarded without modification.

For systems that have more devices than can be identified in a single frame, start count field 811 is used. The first frame would be sent with a start count at 0 and a max count at 72. If it returned full, then a next frame would be sent with start count at 73 and max count at 145, and so on until a frame is returned that is not full.

Given the information in the returned discovery frames, a master can determine how many devices of what sort are available on the network. It can also deduce quite a lot about the topology of the network.

Ethernet interface module 200 provides various network management support functions. One feature that is useful in network error management is that Ethernet interface module 200 has the ability to create a particular frame if it loses a network link on one of the ports 201, 203. The frame is directed to master 400 or a specific multicast address if not programmed otherwise. The frame contains information about the id of Ethernet interface module 200 and the port that has lost its network link. A similar frame is transmitted by Ethernet interface module 200 on the link to a port being reestablished.

The same frame and hardware used for link change notification packets is also be used to send out a general "Hello" message as Ethernet interface module 200 is powered on. This allows master 400 to immediately identify each Ethernet interface module 200 as it becomes active.

A number of network-related values are monitored by Ethernet interface module 200 and counts kept of their occurrence. These counts can then be accessed by master 400 to aid in network diagnostics/etc. Examples of monitored data include:

number of bytes of data received on each port;
 number of bytes of data transmitted on each port;
 number of frames received on each port;
 number of frames acted upon on each port;
 number of invalid frames received on each port (bad FCS);
 number of frames received with invalid security encryption hash on each port; and
 number of frames received with invalid sequence ID on each port Whether by design or because of a failure in the network, in network topologies where there is not a Ethernet interface module 200 at the end of a line, an approach is provided that takes advantage of the standard Internet Control Message Protocol ICMP protocol on a regular Ethernet device downstream of the last Ethernet interface module 200. The regular Ethernet device is referred to in the following as the reflector. This is accomplished by placing the last Ethernet interface module 200 in the line in a special mode illustrated in FIG. 10A.

In this special mode, referred to as a PING encapsulation mode, master 401 sends a command to the last Ethernet interface module 200 in the line to set the following parameters:

define an upstream port, i.e., the port closest to the master 401;
 define a downstream port, i.e., the port facing the downstream reflector;
 provide the Ethernet MAC address of the reflector; and
 program a value indicating the size of the frame header (SH) to be discarded.

This programmability provides support for IP-V6.

At step 10A1, Ethernet interface module 200 receives a PING encapsulation frame 100G. At step 10A3, Ethernet interface module 200 is placed into PING encapsulation mode upon receipt of a PING encapsulation frame 100G, shown in FIG. 1G. Frame 100G includes the address of Ethernet interface module 200 in destination address field 101 and the address of master 401 in source address field 103. Frame 100G further comprises an IP header field 125 and an ICMP echo request header field 127. A PING payload field 100X is also included in frame 100G. Payload field 100x comprises a full Ethernet frame. Ethernet interface module 200 forwards a modified PING encapsulation frame 100H, shown in FIG. 1H via its downstream port. In frame 100H, frame 100G IS modified by replacing the destination address in field 101 of frame 100G with the address of the standard Ethernet device provided during setup, by replacing the source address in field 103 with its own MAC address; and by providing a newly calculated FCS in FCS field 111. The remainder of frame 100G comprising PING payload contents in PING payload field 111 is unchanged. in FIG. 1H.

In the ping encapsulation mode, Ethernet interface module 200 receives an echo response or PONG frame 100J, shown in FIG. 1J, directed to its own unicast MAC address and received on the downstream port. Ethernet interface module 200 discards the first SH bytes of the frame plus an additional 4 bytes if a VLAN header is present and treats the remainder of frame 100J carried in field 100Y as a separate frame and forwards field 100Y via the upstream port, with a new FCS in field 111 generated on the frame in field 100Y. After discarding the header, the next six bytes are treated as a destination address and the following six bytes are treated as the source address. If the remainder of the frame is addressed to Ethernet interface module 20, Ethernet interface module will process it.

Master 401, after configuring Ethernet interface module 200 as described above, will network by creating a Ping frame header as if it were being transmitted from Ethernet interface module 200 to a standard Ethernet node downstream of it, except that the Ethernet destination address is that of Ethernet interface module 200 and the source address is that of the master 401. Master 401 places a standard Ethernet interface module 200 frame, e.g. frame 100A, in the payload field 100X of the Ping frame 100G shown in FIG. 1G. Master 400 transmits the frame to Ethernet interface module 200.

Frame 100G is received on the upstream port of Ethernet interface module 200 at step 10A5 and processed as described above, resulting in a valid PING frame 100H from Ethernet interface module 200 to the reflector device at step 10A7.

The reflector device processes frame 100H as a standard PING frame and transmits the result frame 100J back to Ethernet interface module 200 which is received at step 10A9.

Ethernet interface module 200 removes the PING encapsulation layer from frame 100G at step 10A11, processes and forwards at step 10A13 a standard Ethernet interface module 200 frame contained in field 100Y back upstream in the direction of master 401 and any other Ethernet interface modules 200 present on the same line of the network. The ICMP PING header and IP headers are modified to change from an echo request (ping) to an echo response (pong). As the frame traverses Ethernet interface module 200 on the way back, everything prior to the Ping Payload block 100Y is discarded, leaving a standard frame.

One issue is that an IP address other than that of master 401 must be used for the frame. This is because the repeater will update its ARP table with the IP address in the frame and the associated MAC address. A single such IP address can be used for any and all Ethernet interface modules 200 used in this fashion in a given Ethernet network system.

Figure 11:
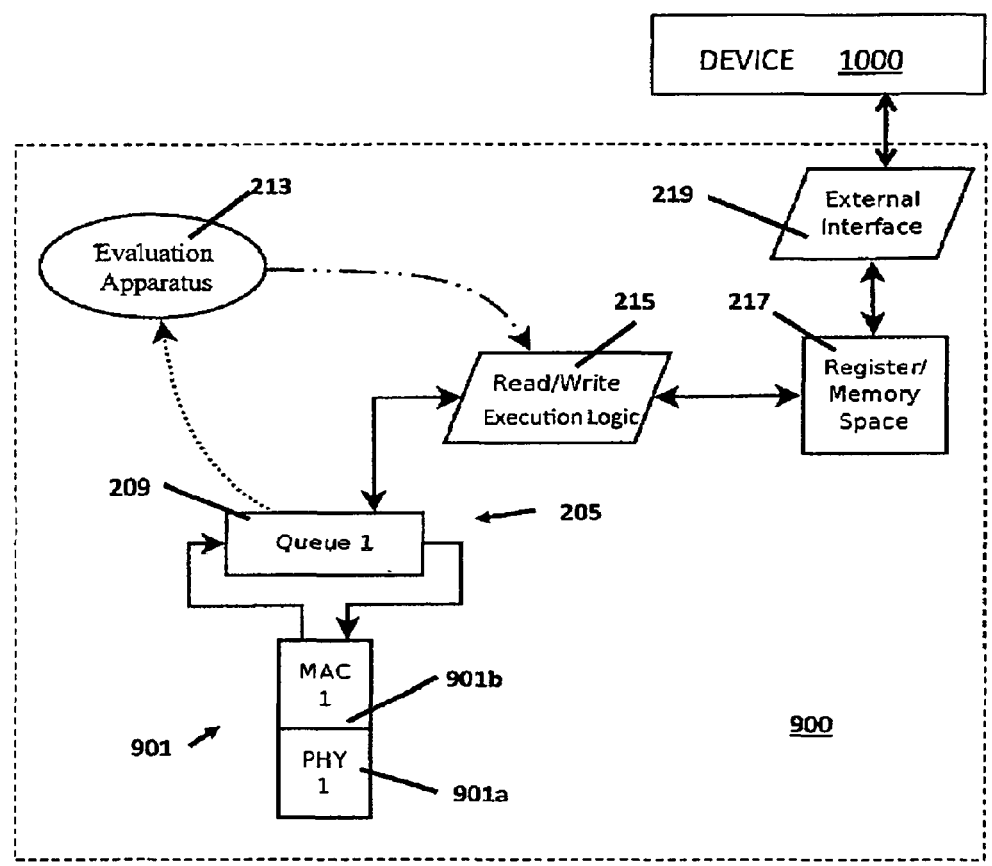
FIG. 11 is a block diagram of second embodiment of an Ethernet interface module.

Another embodiment of an Ethernet interface module 900 is shown in FIG. 11. Ethernet interface module 900 comprises a single full duplex port 901 that uses a single PHY 901a and a single MAC 901b, while maintaining a rich set of topological choices. Rather than using two full-duplex links with data forwarded in two directions, potentially simultaneously, Ethernet interface module 900 uses a single full duplex port 901 to provide the same basic operation as a two-port node. There are different embodiments of Ethernet interface module 900 depending on whether the transmit and receive paths of the full duplex communication are physically separate or the same. If the transmit and receive paths are separate, all of the following discussion applies. If the communication channel is not separate, then such a one-PHY device can only act as a reflector.

The operation of Ethernet interface module 900 is similar to the two-port Ethernet interface module 200, except that traffic coming in on port 901 is forwarded back out same port 901. When in reflector mode it operates exactly like a two port Ethernet interface module 200 in reflector mode. The difference in terms of reflector mode is that the determination to go into reflector mode is not made based on link status; nodes are either fixed as reflector nodes, or there is an external indication from a physical switch, external processor, etc.

To understand the operation of these nodes different network cabling approaches are shown in FIGS. 12 through 15.

Figure 12:
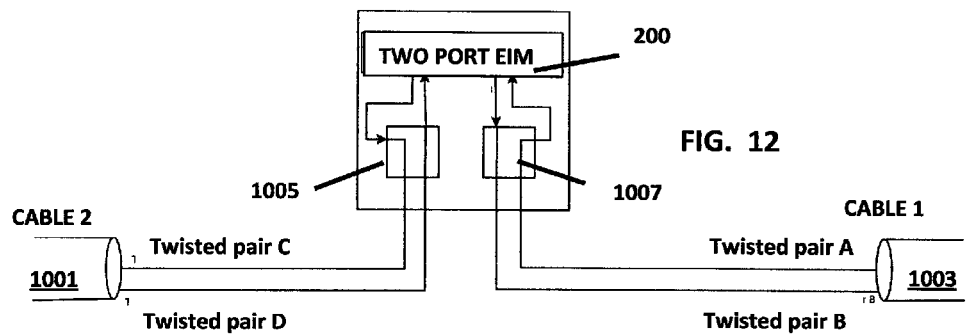
FIG. 12 illustrates Ethernet cable connections to a two-port embodiment in a first configuration.

FIG. 12 illustrates a two-port Ethernet interface module 200 with each port 201, 203 connected to a separate cable 1001, 1003 via two connectors 1005, 1007. Each cable 1001, 1003 comprises two twisted pair wires for communication in two directions. Cable 1001 comprises twisted pairs C, D and cable 1003 comprises twisted pairs A, B.

Figure 13:
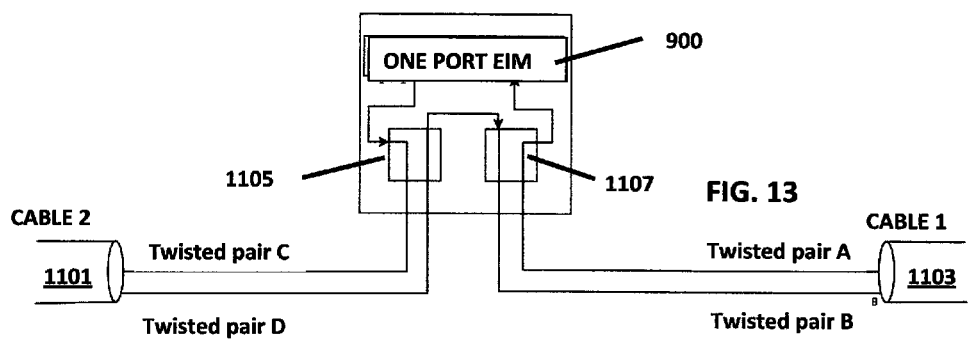
FIG. 13 illustrates Ethernet cable connections to a one-port embodiment in a second configuration.

FIG. 13 illustrates a one-port Ethernet interface module 900 with its single port 901 connected to two different cables 1101, 1103 through two connectors 1105, 1107. One direction of communication is simply connected between the two connectors 1105, 1107 on the node, without passing through the Ethernet interface module 900. The other direction of communication enters port 901 from one cable 1103 and exits the same port 901, being routed to the other cable 1101. Each cable 1101, 1103 comprises two twisted pair wires for communication in two directions. Cable 1101 comprises twisted pairs C, D and cable 1103 comprises twisted pairs A, B.

Figure 14:
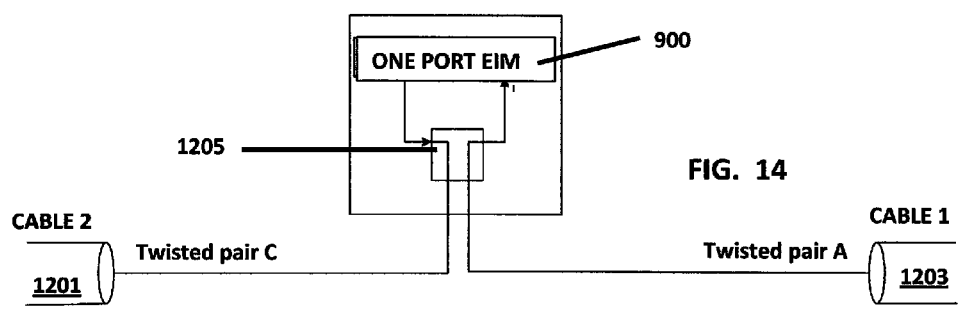
FIG. 14 illustrates Ethernet cable connections to a one-port embodiment in a third configuration.

FIG. 14 illustrates a one-port Ethernet interface module 900 with a single connector 1205. Cable 1201 comprises a single twisted pair C that is used and Cable 1203 likewise comprises a single twisted pair A that is used. This approach requires either a different approach to connectors and/or cables in order to 'splice' the cables as shown. Another approach is to use two connectors similar to FIG. 11, but dispense with the conductors that bypass the LEN logic.

Figure 15:
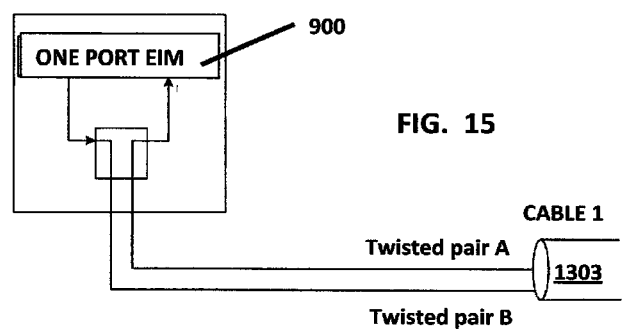
FIG. 15 illustrates Ethernet cable connections to a one-port embodiment in a fourth configuration.

FIG. 15 shows a one-port LEN interface module 900 with a single connector that can be attached directly to a standard Ethernet port 901. This configuration is that of a dedicated reflector (always the last node on a line) and only a single cable 1303 having two twisted pairs is utilized.

Figure 16:
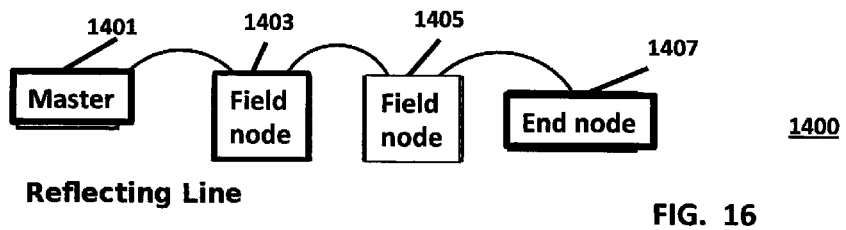
FIG. 16 illustrates a reflecting line Ethernet first topology.

In FIG. 16, an Ethernet topology of a network 1400 is shown in which the cabling shown in FIG. 13 is utilized. Each device or field node 1403, 1405, and end node 1407 has two connectors and the cable has conductors for traffic in both directions. Frames originate at master 1401, are forwarded down the line to field nodes 1403, 1405, and end node 1407 that is the last node in the line. End node 1407 reflects the frames back to master 1401 via field nodes 1403, 1405.

Figure 17:
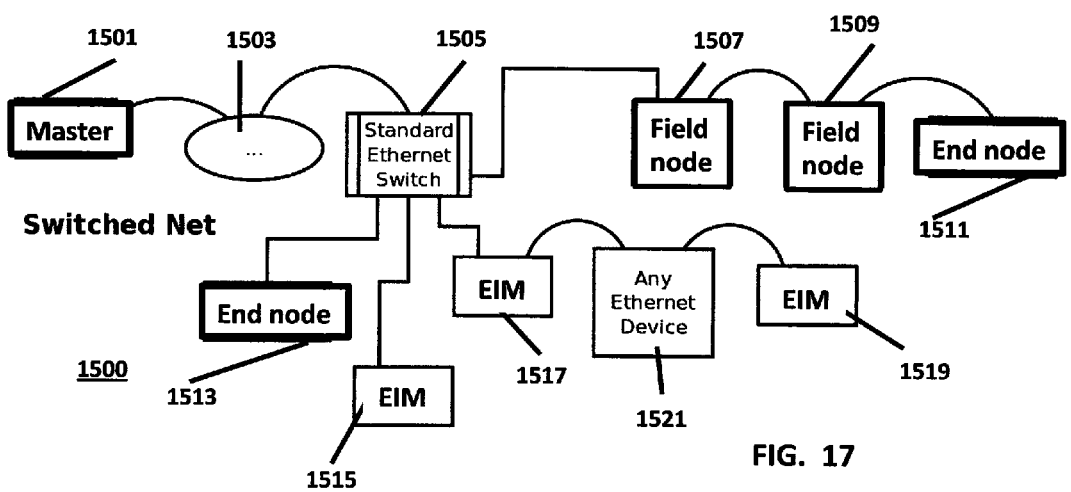
FIG. 17 illustrates a switched network Ethernet topology.

In FIG. 17, a switched network topology of network 1500 is illustrated. An Ethernet master 1501 is provided and communicates with a plurality of devices some of which are represented by block 1503. A standard Ethernet switch 1505 is coupled to field nodes 1507, 1517 and to end nodes 1513, 1515. An additional field node 1509 is coupled to end node 1511 and field node 1517 is coupled to a representative Ethernet device 1521 that in turn is coupled to end node 1519. In this topology, any of the field nodes 1507, 1509, 1517 and any of the end nodes 1511, 1513, 1515, 1519 may comprise Ethernet interface module 200 or Ethernet interface module 900. In addition, Ethernet device 1521 may have the functionality of an Ethernet interface module integrated therein.

Figure 18:
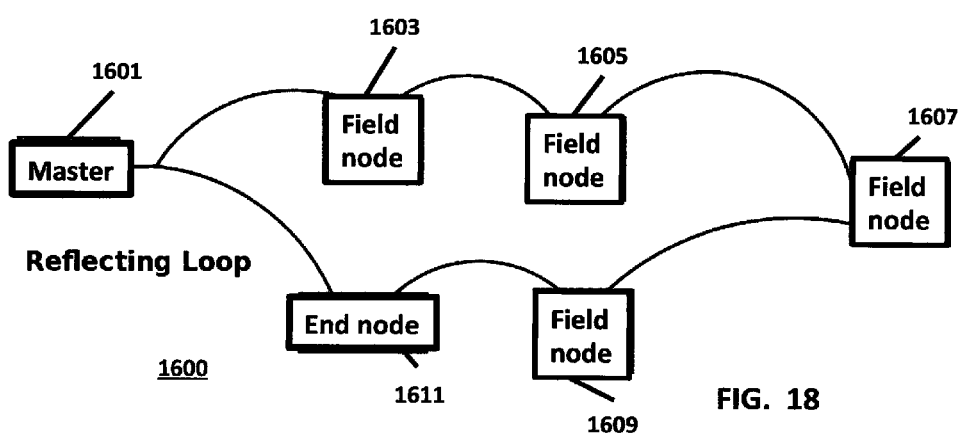
FIG. 18 illustrates a reflecting loop Ethernet topology.

In the topology of network 1600 shown FIG. 18, the cabling is according to FIG. 12. The network 1600 of FIG. 16 is a loop of field nodes 1603, 1605, 1607, 1609 and an end node 1611 using a single direction of conductors (e.g. single copper twisted pair for 100-BASE-TX operation).

For one-port Ethernet interface modules 900, unless they are used strictly as a reflector plugged in to a standard switch port or a port on a two-port device, they cannot participate in auto-negotiation. For this reason, they should typically operate in a fixed communication mode.

Because an Ethernet interface module 200, 900 has all of its communications running at the same data rate, different sets of rules apply to link management. For a dual-port Ethernet interface module 200 the simplest option is to build the device with a fixed data rate and disable any auto-negotiation. This requires that all other ports to which such devices are connected are also fixed data rate and auto-negotiation is disabled.

A more flexible approach in various embodiments is to allow Ethernet interface module 200 to conduct auto-negotiation, but limit the negotiation to a fixed speed. This will work seamlessly with most standard devices to which an Ethernet interface module 200 may associated.

Ethernet interface module 200 can perform a link management initialization as follows:
Establish link on a first port 201;
Establish link on the second port 203; and
If the two link transmission speeds don't match, halt the faster link and restart auto-negotiation forcing the lower transmission speed.

Single-port Ethernet interface module 900 devices can only perform auto-negotiation if they are operating in a mode where both directions are resolved to the same port on another device. In the case of a network 1600 of that provides a Reflecting Loop topology shown in the FIG. 16, there can be no auto-negotiation and fixed frequencies must be used.

Ethernet interface modules 200, 900 can be implemented using a wide variety of approaches.

In one embodiment, Ethernet interface modules 200, 900 comprise a programmable device that can operate sufficiently regularly to perform the frame processing and forwarding in software, coupled with MAC functionality (either hardware or software) and PHYs.

In other embodiments, Ethernet interface modules 200, 900 may comprise an integrated circuit that performs the core Ethernet interface module functions and MAC functions that is coupled with external PHYs.

In further embodiments, Ethernet interface modules 200, 900 may comprise an integrated circuit that performs the core Ethernet interface module functions with PHYs incorporated on the same IC.

In further embodiments, Ethernet interface modules 200, 900 may comprise an integrated circuit that performs the core Ethernet interface module functions well as dedicated I/O operations (e.g. an Analog-to-Digital convertor on the same IC).

In further embodiments, Ethernet interface modules 200, 900 may comprise an integrated circuit that performs the core Ethernet interface module functions and MACs, with or without PHYs on the same IC.

Any of the above may be implemented in programmable hardware such as a field programmable gate array (FPGA).

Synchronization of Ethernet interface modules 200, 900 with other devices on a network, when necessary, can be accomplished in various ways. In one embodiment the timing of an incoming Ethernet interface module command frame may be used to generate a signal to timestamp the event or even directly control a clock management block.

Various features may be provided to Ethernet interface modules 200, 900 to perform time stamping, clock frequency management, etc. In addition certain embodiments of Ethernet interface modules 200, 900 may recognize frames from other protocols such as IEEE 1588 V2 and utilize those protocols.

A watchdog timer function may be provided in Ethernet interface modules 200, 900. Such a function includes a timer that measures a maximum time between reception of a particular command or one of a set of commands. If the time is exceeded then some action is taken such as generating a signal to external hardware, replacing data in the Electronic interface module 200, 900 with default values, etc.

The precise communications frequency on a receiving port of a device is determined by the peer device that is transmitting the frame, while the frequency of the packet being retransmitted out the other port is determined by the local device. These two frequencies will not typically match exactly due to differences in the oscillators on the two devices, temperature effects, etc. There are two issues raised by this difference.

The first issue is that a certain amount of buffering is necessary on the local device so that if its transmit clock is faster than the data it is receiving, it will not run out of data to transmit before the end of the frame. Likewise, if the transmitting clock is slower, it must be able to buffer up additional data that is received before reception of the incoming frame is complete. The forwarding time, which consists of preamble transmission plus the time it takes to receive the destination address is adequate to cover a faster transmit clock. Similar buffering levels, on the order of a few bytes, are sufficient for handling the slow transmit clock case.

The second issue is specific to high performance networks. Some networks depend on very consistent timing of frames traversing the network. Examples include PROFINET IRT networks, SERCOS III networks, and various network protocols that utilize Ethernet to distribute precise timing. In these cases the jitter introduced by having differences in transmit and receive clocks on an Ethernet interface module 200, 900 node are problematic. To resolve this problem, Ethernet interface module 200, 900 may use a clock recovered from the signal on the receive port 201, 901 to drive the transmit port transmission 203, 903. This will keep the time it takes a packet to traverse an Ethernet interface module 200, 900 node to a very consistent level and allow seamless operation in these high-performance networks.

The master function in a network containing Ethernet interface modules 200, 900 can be performed by any Ethernet-aware device with reasonable processing capability. This could be a personal computer, a cloud-based server, a programmable logic controller, or a dedicated controller. The performance requirements for the master are entirely a function of the needs of the networked devices. The frequency of frames to devices may range from microseconds for some applications to hours for others, the protocol is entirely agnostic with regards to this.

A local area network (LAN) comprising Ethernet interface modules 200, 900 may be integrated into a broader network including Internet of Things (IoT) applications. If an Ethernet interface module device needs to be accessed via Internet Protocol (IP) or via functions that are not directly accessible via the local Ethernet LAN, this can be achieved through "IP Virtualization". In this Internet protocol (IP) Virtualization, frames can be encapsulated in UDP or TCP packets and sent using IP protocols to another IP-capable node on the LAN where the Ethernet interface modules reside. This remote IP-capable node strips off the upper layer protocols (e.g. IP/TCP) and transmits the raw frames, then re-encapsulate the returned frames and transmit them using IP to the master. It would be a straightforward process to build dedicated appliances to encapsulate and forward frames in this fashion, both on the same LAN as the master (or directly within the master itself) and at the remote LAN where the Ethernet interface modules reside.

There are a myriad of potential uses for the approach of utilizing Ethernet interface modules 200, 900 to communications and control. These uses are especially broad due to the combination of high bandwidth and low cost for a network of Ethernet interface modules 200, 900.

Ethernet interface modules may be utilized with domestic appliances to communicate any level of complexity of status and control information to a single controller in the house, or to multiple controllers. This allows for a unified control interface for appliances within the house and provides a single place that needs to be managed for Internet-level access and security issues, etc.

In addition to major appliances, e.g., washer/dryer, dishwasher, furnace/AC, range, refrigerator, etc., Ethernet interface module nodes may be used for smaller devices such as thermostats, fire detectors, and the like. For example, in the thermostat market there is a move to 'smart' thermostats with enhanced functionality (and substantial cost). Utilizing an Ethernet interface module with a thermostat and augment it with software on the controller can provide low cost "smart thermostat" functionality with an arbitrary level of functionality.

Still further, the use of Ethernet interface module 200, 900 can reduce the cost of basic home wiring by using twisted-pair wiring to communicate among wall-switches, light fixtures, outlets, etc. In this arrangement, the heavy copper wiring used to provide power would be strung among light fixtures and outlets by the shortest path, with electronic switches in place controlled by Ethernet interface module 200, 900 nodes. Wall switches are very simple Ethernet interface module 200, 900 devices 1000 with only communications wiring and low-voltage power supplied to them, e.g. using one of the Power-Over-Ethernet standards. The result is reduced labor of installation, cost of the wiring and enhanced flexibility of control so that the correlation of switches and fixtures are programmable and all of the house wiring is under the control of a master.

In industrial settings, Ethernet interface modules 200, 900 may be used in many devices that currently use much more complex systems, both Ethernet and other communication layers. Also, devices with Ethernet interface modules 200, 900 can be interspersed among other types of devices in most networks. For example, a low-cost Ethernet Internet module device could be placed on a network operating PROFINET IRT with no negative impact on the IRT network because of the deterministic forwarding nature of Ethernet interface modules 200, 900.

Ethernet interface modules 200, 900 may be used widely in the automotive realm. From dome light controls, door lock controls, to communication with critical infrastructure such as brakes, etc. Similar to incorporation with high-performance Industrial networks, Ethernet interface modules 200, 900 can be placed in high performance automotive networks regardless of network timing and management protocols, enabling the sale of a single device design to multiple auto manufactures, even if they take different approaches to their network architecture.

The invention has been described in terms of various embodiments. It will be appreciated by those skilled in the art that various changes and modifications may be made without departing from the scope of the invention. It is not intended that the invention be limited by the specific embodiments shown and described. It is intended that the invention be limited in scope only by the claims appended hereto.

What is claimed is:

1. An Ethernet interface module configured to couple a device to an Ethernet network, the Ethernet interface module comprising:
    a first network port configured to receive and transmit frames of packetized information via the Ethernet network, wherein a frame includes a number of frame bytes;
    a second network port configured to receive and transmit frames via the Ethernet network;
    a device interface including a device port and configured to transfer data between the Ethernet interface module and the device;
    at least a first queue operatively coupled to the first network port and the second network port and configured to receive a frame via a receiving network port, wherein the first queue comprises a number of bytes less than the number of frame bytes such that, as the frame traverses the first queue, a first portion of the frame is transmitted from the first queue concurrent with a second portion of the frame being received by the receiving network port; and
    evaluation circuitry operatively coupled to the first queue and configured to modify the received frame of packetized information when detecting that a queued portion of the received frame contains a destination that matches the device.

2. The Ethernet interface module of claim 1, including:
    a second queue that comprises a number of bytes less than the number of frame bytes; and
    wherein the first queue is configured to transfer bytes of frames of packetized information from the first network port to the second network port and the second queue is configured to transfer bytes of frames of packetized information from the second network port to the first network port.

3. The Ethernet interface module of claim 1, wherein:
    the evaluation circuitry is configured to, when the device is included in an end node of the network, initiate a change of a destination address in the frame of packetized data to a source address when the destination of the frame of packetized information matches the device, and discard the frame of packetized data when the destination of the frame of packetized information does not match the device.

4. The Ethernet interface module of claim 3, including a second network port configured to receive and transmit frames of packetized information via the network; and wherein the evaluation circuitry is configured to detect that the device is included in an end node of the network upon detecting that a communication link is connected to only one of the first network port or the second network port.

5. The Ethernet interface module of claim 1, wherein: the evaluation circuitry is configured to provide the frame of packetized information through the first queue to the network when an Ethernet type field value of the frame of packetized information does not match an Ethernet type value of the device.

6. The Ethernet interface module of claim 1, wherein: the evaluation circuitry is configured to, when the device is not included in an end node of the network, initiate a change of a destination address of the frame of packetized information from a unicast address to a multicast address when the destination of the frame of packetized information matches the device.

7. The Ethernet interface module of claim 6, including a second network port configured to receive and transmit frames of packetized information via the network: and wherein the evaluation circuitry is configured to detect that the device is not included in an end node of the network upon detecting that a communication link is connected to each of the first network port and the second network port.

8. The Ethernet interface module of claim 1, wherein: the evaluation circuitry is configured to, when the device is not included in an end node of the network, provide the frame of packetized information through the first queue to the network when the destination of the frame of packetized information does not match the device.

9. The Ethernet interface module of claim 1, including a second network port configured to receive and transmit frames of packetized information via the network: and wherein the evaluation circuitry is configured to detect a loss of a network link on either the first network port or the second network port, and generate and transmit a frame identifying the Ethernet module and the port with the lost network link.

10. The Ethernet interface module of claim 1, wherein: the evaluation circuitry is configured to detect a discovery command identifier in a command field of a portion of the frame in the first queue, and update specified device information in the frame.

11. The Ethernet interface module of claim 1,
    including a second network port, wherein the evaluation circuitry is configured to: detect a PING frame command identifier in a command field of a portion of the frame in the first queue; replace a destination address in the PING frame with a destination address of a network device operatively coupled to the second network port; replace a source address in the PING frame with an address of the Ethernet interface module: and transmit the PING frame to the network device.

12. The Ethernet interface module of claim 1, including a second queue configured to transfer bytes of frames of packetized information from the second network port to the first network port, wherein the second queue comprises a number of bytes less than the number of frame bytes; wherein the evaluation circuitry is configured to: detect a PONG frame command identifier in a command field of a portion of a frame in the second queue; replace the destination address of the PONG frame with a source address of the received PING frame; replace the source address of the PONG frame with the address of the Ethernet interface module.

13. The Ethernet interface module of claim 1, including:
a second network port configured to receive and transmit frames of packetized information via the network; and
a second queue configured to advance frames of information from the second network port to the first network port to one or more upstream Ethernet interface modules in an upstream network direction toward a master network device, wherein the second queue comprises a number of bytes less than the number of frame bytes; and wherein the first queue is configured to advance bytes of frames of packetized information from the first network port to the second network port to one or more downstream Ethernet interface modules in a downstream network direction away from a master network device.

14. The Ethernet interface module of claim 1, including read/write circuitry configured to read bytes of the frame of packetized information from the first queue and transfer the bytes of information to the device via the device interface, and write bytes of information received from the device into the first queue as the frame of packetized information is advanced in the first queue.

15. The Ethernet interface module of claim 1, wherein the frame of packetized information comprises a sequence identification field containing a sequence identification, and the evaluation circuitry is configured to identify a predetermined relationship of the received frame to a previous received frame according to the sequence identification.

16. The Ethernet interface module of claim 15, wherein: the evaluation circuitry is configured to perform a predetermined operation with the received frame when the sequence identification of the received frame does not have the predetermined relationship.

17. The Ethernet interface module of claim 16, wherein: the predetermined operation comprises rejection of the received frame and no operation is performed.

18. The Ethernet interface module of claim 17, wherein: the predetermined operation comprises providing an indication to a source of the received frame that the received frame has been rejected by modifying and forwarding the received frame.

19. The Ethernet interface module of claim 1, wherein: the frame of packetized information includes a source address field and a command field, wherein the source field indicates a master network device as originating the frame: and the command field includes one or more associated data fields comprising associated command data.

20. The Ethernet interface module of claim 19, wherein: the Ethernet interface module comprises a unique identification key provided to both the Ethernet interface module and the master network device.

21. The Ethernet interface module of claim 20, wherein: the frame comprises a sequence identification field and a security field, the sequence identification field comprises a sequence identification and the security field comprises an encrypted hash value for first data contained in one of the associated data fields.

22. The Ethernet interface module of claim 21, wherein: the encrypted hash value is computed over the sequence identification and the first data using the unique identification key.

23. The Ethernet interface module of claim 22, wherein: the frame comprises a second sequence identification field and a second security field, wherein the second sequence identification field comprises a second sequence identification and the second security field comprises a second encrypted hash value for second data contained in a second of the associated data fields.

24. The Ethernet interface module of claim 23, wherein: the second encrypted hash value is computed over said second sequence identification and said second data using the unique identification key.

25. The Ethernet interface module of claim 24, further including:
a first data register;
a second data register;
apparatus operable on the received frame to check the first data with the first encrypted hash value and check the second data with the second encrypted hash value;
the apparatus is configured for:
storing the first data in the first data register if the first encrypted hash value verifies the integrity of the first data and storing the second data in the second register if the second encrypted hash value verifies the integrity of the second data; and
comparing the first stored data and the second stored data;
at least one of the first stored data and the second stored data outputted to the device if the first stored data and the second stored data are identical; and
wherein the Ethernet interface device rejects the received frame if the first stored data and the second stored data are not identical.

26. The Ethernet interface module of claim 1, wherein the evaluation circuitry is configured to transmit the frame unmodified via one of the network ports while the other network port is receiving the frame when the destination does not match the device.

27. A method of operating an Ethernet interface module to couple a device to a network, the method comprising:
receiving and transmitting a frame of packetized information via the network using a first network port and a second network port of the Ethernet interface module;
transferring data with the device using a device port of a device interface;
receiving a first portion of the frame of packetized information into a first queue, wherein the frame is received using the first network port concurrent with transmitting a second portion of the frame of packetized data from the first queue using the second network port; and
modifying the frame of packetized information when detecting that the first portion of the received frame in the first queue contains a destination of the received frame that matches the device, and forwarding the received frame unmodified when the destination does not match the device.

28. The method of claim 27 including:
advancing the bytes of the frame of packetized information from the first network port through the first queue to the second network port; and advancing bytes of a second frame of packetized information from the second network port through a second queue to the first network port, including receiving a first portion of the second frame into the second queue concurrent with transmitting a second portion of the second frame from the second queue; and initiating a transfer of information with the device according to a command detected in the second queue.

29. The method of claim 28, wherein advancing the bytes of the frame of packetized information from the first network port through the first queue to the second network port includes advancing the frame to one or more downstream Ethernet interface modules in a downstream network direction away from a master network device, and wherein advancing bytes of a second frame of packetized information from the second network port through a second queue to the first network port includes advancing the second frame to one or more upstream Ethernet interface modules in an upstream network direction toward a master network device.

30. The method of claim 27, including initiating, when the device is included in an end node of the network, a change of a destination address in the frame of packetized data to a source address when the destination of the frame of packetized information matches the device, and discarding the frame of packetized data when the destination of the frame of packetized information does not match the device.

31. The method of claim 30, including receiving and transmitting the frame of packetized information using the first network port and a second network port; and detecting, by the Ethernet interface module, that the device is included in an end node of the network upon detecting that a communication link is present at only one of the first network port or the second network port.

32. The method of claim 27, including providing the frame of packetized information through the first queue to the network when an Ethernet type field of the frame of packetized data does not match an Ethernet type of the device.

33. The method of claim 27, including initiating, when the Ethernet interface module determines that the device is not included in an end node of the network, a change of a destination address of the frame of packetized information from a unicast address to a multicast address when the destination of the frame of packetized information matches the device.

34. The method of claim 33, including receiving and transmitting the frame of packetized information using the first network port and a second network port; and detecting, by the Ethernet interface module, that the device is not included in an end node of the network upon detecting that a communication link is present at each of the first network port and the second network port.

35. The method of claim 27, including providing, when the Ethernet interface module determines that the device is not included in an end node of the network, the frame of packetized information through the first queue to the network when the destination of the frame of packetized information does not match the device.

36. The method of claim 27, including receiving and transmitting the frame of packetized information using the first network port and a second network port; detecting a loss of a network link on either the first network port or the second network port; and transmitting a frame identifying the Ethernet interface module and a network port with the lost network link.

37. The method of claim 27, including detecting a discovery command identifier in a command field of a portion of the frame in the first queue, and updating specified device information in the frame according to the discovery command.

38. The method of claim 27, including receiving and transmitting the frame of packetized information using the first network port and a second network port; identifying the frame as a PING frame using a PING frame command identifier in a command field of a portion of the frame in the first queue; replacing a destination address in the PING frame with a destination address of a network device operatively coupled to the second network port as the PING frame advances through the first queue; and replacing a source address in the PING frame with an address of the Ethernet interface module as the PING frame advances through the first queue.

39. The method of claim 38, including advancing bytes of frames of packetized information from the second network port to the first network port through a second queue, wherein the second queue comprises a number of bytes less than the number of frame bytes; detecting a PONG frame advancing in the second queue; replacing the destination address of the PONG frame with a source address of the received PING frame as the PONG frame advances in the second queue; and replacing the source address of the PONG frame with the address of the Ethernet interface module as the PONG frame advances in the second queue, wherein a first portion of the PONG frame is received into the second queue concurrent with a second portion of the PONG frame being transmitted from the second queue.

* * * * *